United States Patent [19]

Mousseau et al.

[11] Patent Number: 5,559,800
[45] Date of Patent: Sep. 24, 1996

[54] REMOTE CONTROL OF GATEWAY FUNCTIONS IN A WIRELESS DATA COMMUNICATION NETWORK

[75] Inventors: Gary P. Mousseau; Mihal Lazaridis; Herb A. Little; Michael A. Barnstijn, all of Waterloo, Canada

[73] Assignee: Research In Motion Limited, Ontario, Canada

[21] Appl. No.: 183,598

[22] Filed: Jan. 19, 1994

[51] Int. Cl.$^6$ .................................................. H04L 12/66
[52] U.S. Cl. ............................................................ 370/85.13
[58] Field of Search ....................... 370/85.1, 85.13, 370/85.14, 95.1, 95.2, 94.1, 95.3, 110.1, 61; 455/33.1, 33.2, 33.3, 33.4; 379/60, 61, 62

[56] References Cited

U.S. PATENT DOCUMENTS 5,159,592  10/1992  Perkins .
5,327,426  7/1994  Dolin, Jr. et al. .................. 370/85.13
5,355,365  10/1994  Bhat et al. ........................... 370/85.13

FOREIGN PATENT DOCUMENTS 0483547  5/1992  European Pat. Off. .
9315572  8/1993  WIPO .

OTHER PUBLICATIONS

Douglas E. Comer, "Internetworking with TCP/IP", 1991, pp. 44–49, 365–385, second edition, vol. I.
Sun Microsystem, User manual for Unix OS, Mar. 2, 1987, Section: Screen Command, pp. 1–12.

*Primary Examiner*—Wellington Chin
*Assistant Examiner*—Huy D. Vu
*Attorney, Agent, or Firm*—Jones, Day, Reavis & Pogue

[57] ABSTRACT

The present invention provides a method for user control of a gateway in a wireless data communicator network. The present invention includes transmitting a data packet to the gateway, including control data continuing a plurality of commands to be executed by the gateway. The gateway then parses the plurality of commands and executes the commands.

28 Claims, 19 Drawing Sheets

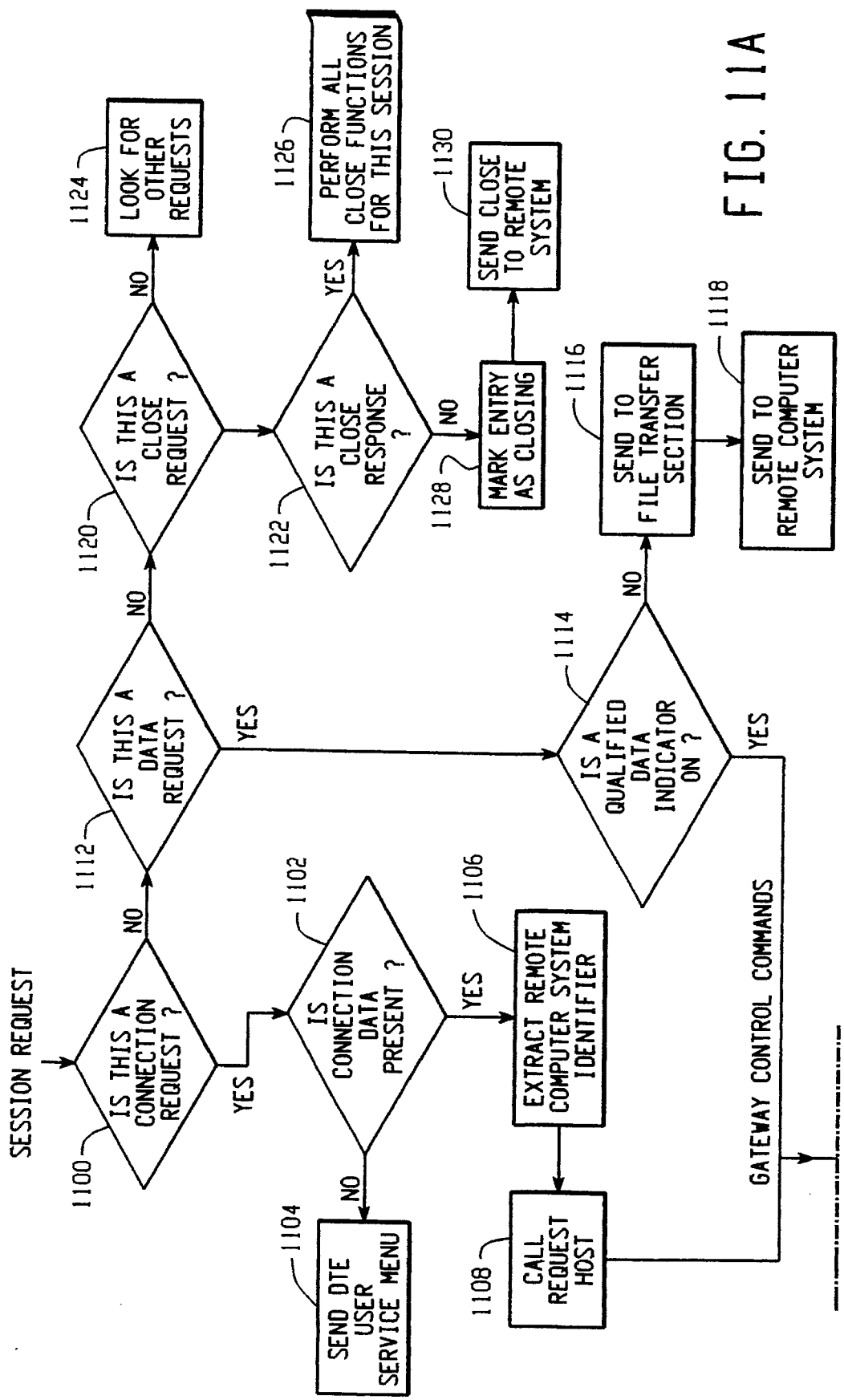

REMOTE CONTROL OF GATEWAY FUNCTIONS IN A WIRELESS DATA COMMUNICATION NETWORK

BACKGROUND OF THE INVENTION

1. Field of the Invention

This invention relates generally to the art of connecting data terminal equipment (DTE) users to remote computer systems (or hosts) through a wireless or radio wave data communication network. More particularly, the present invention relates to the remote control of a gateway in a wireless communication network.

2. Description of the Related Art

Over the past several decades, various communication networks have evolved to meet the growing need for access to information. Among the more familiar types of systems used for communication are wire-based telephone communication systems that use physical wires or optical fiber links to connect users. Data transmission using wire-based telephone communication systems can be accomplished using existing AT Modem technology. An AT Modem is a standard data communication equipment (DCE) connection device used with telephone equipment for converting or modulating an asynchronous stream of data into a phone line carrier signal. The connection between an AT Modem and a DTE, such as a personal computer or a portable computer, is usually through an RS-232 interface. One of the principal disadvantages of a wire-based telephone communication network is that users are limited to specific locations where wired connections are available. Another disadvantage is that wire-based telephone communication networks usually require dedicated telephone lines, which can be expensive.

Recently wireless data communication networks have emerged that enable information exchange by sending and receiving data through high frequency radio signals. Examples of such networks include the Mobitex Radio Network (Mobitex), which is operated by RAM Mobile Data, and Ardis, which is a joint venture of Motorola and IBM. Mobitex was developed in Sweden by Ericsson/Eritel and has been installed and is maintained in many other countries. For example, in Canada, Mobitex is operated by Roger's Cantel. Making efficient use of these wireless data communication networks to connect DTE users to remote computer systems is one of the objects of this invention.

Electronic data communication is organized into networks that have established protocols and specifications. Communication between computers takes place over a connection that is established using a common protocol. A data communication network generally refers to a collection or grouping of computers organized for co-operative communication of data. Once a connection is established, there are a number of data transfer methods used by various data communication networks. Both Mobitex and Ardis use packet switched data transfer methods, which aggregate data into blocks called packets before it is transmitted.

Ericsson also manufactures a device called a Mobidem, that is a radio-based modem capable of transmitting digital information across the Mobitex data communication network. Communication between Mobitex and data communication networks or just a single personal computer is now possible.

Many problems can arise when a wireless network, like Mobitex, attempts to supply connections to existing networks and computers. For discussion purposes, the example of linking Mobitex to an X.25 network or a computer supporting the X.25 protocol will be used throughout the specification, though it is to be understood that the present invention can be configured for other protocols.

The linking of Mobitex to an X.25 network creates several problems including the following:

(a) Timing errors cause many standard data transfer protocols to fail. The tremendous speed difference between the slow running Mobitex and a very fast X.25 is the main cause of such failures.

(b) Because of the timing errors many potential customers' needs are not met, which in turn mattes the product difficult to sell.

(c) The sizes of information packets can vary between two networks resulting an underutilization of packet space and reducing communication performance.

(d) A DTE is limited to using only one session at a time when connecting into Mobitex using the Mobidem-AT, an AT Modem device.

(e) No standard method exists for updating address changes for mobile units bridged to networks or other computer systems. Also, no standard method exists for addressing remote systems through a gateway for an access point.

Using a particular protocol, a gateway bridges the gap between the connecting parties. The objective of the present invention is to provide a gateway product with enhanced speed, performance, and compatibility when bridging different networks. By providing a fast and efficient gateway connection, in accordance with the present invention a flexibility in communications with mobile users is achieved and the problems outlines above are, in large measure, solved.

SUMMARY OF THE INVENTION

In view of the drawbacks of the prior wireless network, it is the object of the present invention to solve the previously mentioned communication obstructions in a way that is compatible with wireless data communication networks and works within the limitations of the AT modem interface.

To achieve the above-noted object, the preferred system configuration of the present invention includes use of data terminal equipment (DTE), such as a portable computer, together with data communication equipment (DCE), such as the Mobidem AT manufactured by Ericsson, to communicate with a remote computer system or network. Data transmission between the DTE and the DCE consists of a serial data stream. Preferably, the connection between the DTE and the DCE is RS-232 compatible. The DCE processes the data received from the DTE user, bundles the data into packets and transmits the data packets through a wireless communication network, such as Mobitex, to a gateway. The gateway receives the data transmitted by the DCE and processes that data so that it is compatible with the X.25 standard for packet network interfaces and can be transmitted to any remote computer system or network as long as that system is X.25 compatible. As those skilled in the art will appreciate, although the preferred system configuration incorporates a gateway that is X.25 compatible, the gateway may be configured so that it is compatible with any standardized protocol.

In a similar fashion, using the preferred system configuration, any remote computer system that is X.25 compatible can transmit information to a DTE user. The remote computer transmits the information in X.25 data packets to the gateway, which disassembles the X.25 data packets and reassembles the data into packets suitable for transmission through a wireless communication network, such as Mobitex. The DCE receives the information transmitted through the wireless communication network and processes that information so that it can be transmitted in a serial data stream to the DTE user.

Furthermore control data is introduced to address the problem of bridging networks. The present invention includes this control data in order to provide a method of linking a wireless communication network with a remote computer system or network and, in large measure, solves the previously discussed problems and limitations of such an operation. From the Mobidem AT, the DTE user sends control data or qualified data to the gateway. The control data is not transmitted to the remote system after this point. Similarly, the gateway addresses control data to the DTE user's Mobidem-AT without the DTE user receiving it.

Since control data can be sent across Mobitex or another wireless communication network the DTE user can now issue commands targeted for the gateway to process. These commands invoke remote gateway functions. This direct communication, invoking gateway functions, is also possible at connection time because the gateway treats connection data (data requesting a connection with the gateway) as control data. Access to the control data on Mobitex is possible because of the recent addition of the Mobitex Transport Protocol (MTP/1) specification. The presence of the control data allows the gateway to solve many of the previously stated problems when bridging networks.

To accomplish the object of solving wireless speed problems, single session limitations, and remote system addressing limitations, the present invention uses qualified and connection data. The preferred gateway performs several steps in receiving Mobitex data in the form of MPAKs (Mobitex Packet Data). The gateway decodes the MPAKs to determine if connection or qualified data is present. Next, by interpreting the qualified or connection data, the gateway performs functions on behalf of the DTE user. These functions include the selection of the remote computer system, the acceleration of interaction with the remote computer system through scripting, the invocation of file transfer protocols, and the ability to open and switch between many sessions (session switching). The gateway performs these functions internally or externally on the X.25 remote computer system or network.

Scripting is a technique which allows the gateway to accelerate the process of filtering the remote system data by using DTE user guidelines and commands. Filtering keeps unnecessary data from being sent over Mobitex to the DTE user and submits the needed responses to the remote computer, resulting in an accelerated interaction with the remote computer for this connection.

Through the use of a file transfer protocol, the DTE user can exchange file information with the remote computer system. The gateway provides a two-step method for a DTE user to exchange files with a remote computer system. In this two-step process, the file is sent to the gateway and then transferred to either the remote computer system or DTE user, depending on the direction the data is going. This particular method allows the gateway to perform traditional file transfer protocols, but not over the slower wireless data network link.

Session switching in the gateway allows the DTE user to open, switch between, and close multiple remote system connections. By issuing session switching commands the DTE user can manage a large number of personal connections simultaneously.

The present invention overcomes the drawbacks and accomplishes the objects of the invention set forth above.

BRIEF DESCRIPTION OF THE DRAWINGS

The novel and useful features of the invention are set forth in the claims. The invention itself, however, as well as specific features and advantages of the invention may be best understood by reference to the detailed description that follows, when read in conjunction with the accompanying drawings.

DESCRIPTION OF THE PREFERRED EMBODIMENT

Figure 1:
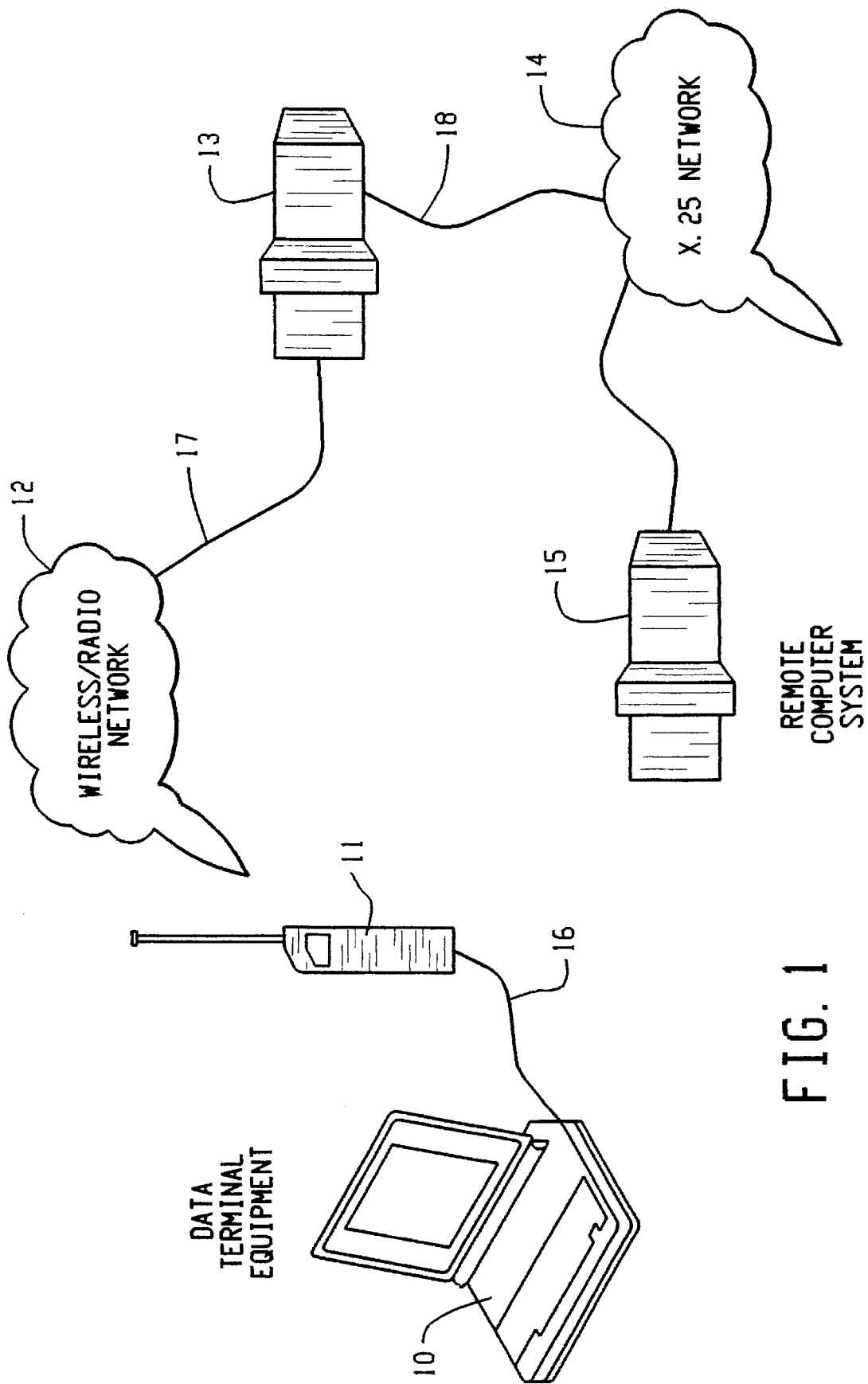
FIG. 1 is a block diagram that illustrates a typical connection between a DTE user and a remote computer system through a wireless data communication network.

FIG. 1 shows the preferred system configuration for use of the present invention. A typical system consists of a DTE 10, such as the portable computer shown, a modem 11 suitable for use with a wireless communication network such as the Mobitex Radio Network 12, a gateway 13, such as the RIMGATE shown which is manufactured by Research In Motion, Ltd., an X.25 network 14, and a remote computer system 15 connected to X.25 network 14. Gateway 13 provides communication between Mobitex 12 and X.25 network 14. Alternatively, gateway 13 may be connected directly to remote computer system 15, since both are X.25 compatible. In the preferred embodiment, modem 11 is a Mobidem, but may be any radio based modem that is capable of transmitting digital information across a wireless data communication network, such as Mobitex 12. DTE 10 is, preferably, connected to modem 11 by a standard RS-232 cable 16 suitable for bi-directional transmission of serial data. Mobitex 12 is connected to gateway 13 by a leased access line and gateway 13 is connected to X.25 Network 14 by a modem (not shown).

The system configuration, illustrated in FIG. 1, allows the DTE 10 user to communicate effectively with remote computer system 15. Information is transmitted from DTE 10 to modem 11 as an asynchronous stream of data. Modem 11 receives this data, processes it, and assembles it into Mobitex data packets (MPAKs), which are suitable for transmission through Mobitex 12. Mobitex 12 receives the MPAKs transmitted by modem 11 and relays those MPAKs to gateway 13. Gateway 13 disassembles the MPAKs and reassembles the data into X.25 data packets that can either be transmitted through X.25 network 14 to remote computer system 15 or, if there is a direct connection between the gateway 13 and the remote computer system 15, transmitted directly to remote computer system 15.

In a similar fashion, remote computer system 15 can transmit information to DTE 10. Remote computer system 15 transmits X.25 data packets to gateway 13, where they are disassembled and reassembled into MPAKs that are transmitted through Mobitex 12 to modem 11. Modem 11 disassembles the MPAKs and transmits the data to DTE 10 as a serial asynchronous data stream.

In FIG. 1, gateway 13 acts as an intermediate node between Mobitex 12 and X.25 Network 14. Instead of connecting to remote computer system 15, a DTE 10 user may communicate with another DTE 10 user (not shown) by designating that data packets be routed to another modem 11 (not shown). In this way, a DTE 10 user can communicate directly with another DTE 10 user through Mobitex 12.

Modems 11 have two basic states of operation; a command state and a data transfer state. In the command state, the DTE 10 user can send command signals to modem 11 to set various modem operating parameters and store these parameters in memory. The DTE 10 user sets these parameters by sending control signals across RS-232 cable 16 to modem 11. These parameters may be stored in a memory device, such as an electrically alterable ROM, so that the user's selected operating parameters are not lost if modem 11 is turned off and back on.

One of the commands referenced in this patent is the ability to transmit connection or qualified data. During the data transfer state the only way for the DTE 10 user to send a message to the gateway, without sending the data to the remote computer system 15, is to use qualified data.

Similarly, a gateway 13 possesses two states of operation. These states include a connecting or connect state and a connected or data transfer state. During the connecting state the gateway 13 offers several ways for a given DTE 10 user to address remote computer system 15. The primary method, as discussed in detail below, is for the gateway 13 to look for connection data that it will use to address the remote computer system 15 and to perform scripting or other gateway functions. In the data transfer state, all data received from the DTE 10 user passes directly to the remote computer system 15 and all data from the remote computer system 15 passes to the DTE 10 user. As previously discussed, the control channel is the only way a DTE 10 user can send gateway commands during the data transfer state. The DTE 10 user accesses the control channel by leaving the data transfer mode and issuing an AT command. The gateway 13 functions accessible by the DTE 10 user on the control channel, or during the connect state, include gateway scripting, file transfer, and session switching. This process and the related gateway functions are discussed in detail below.

Figure 2:
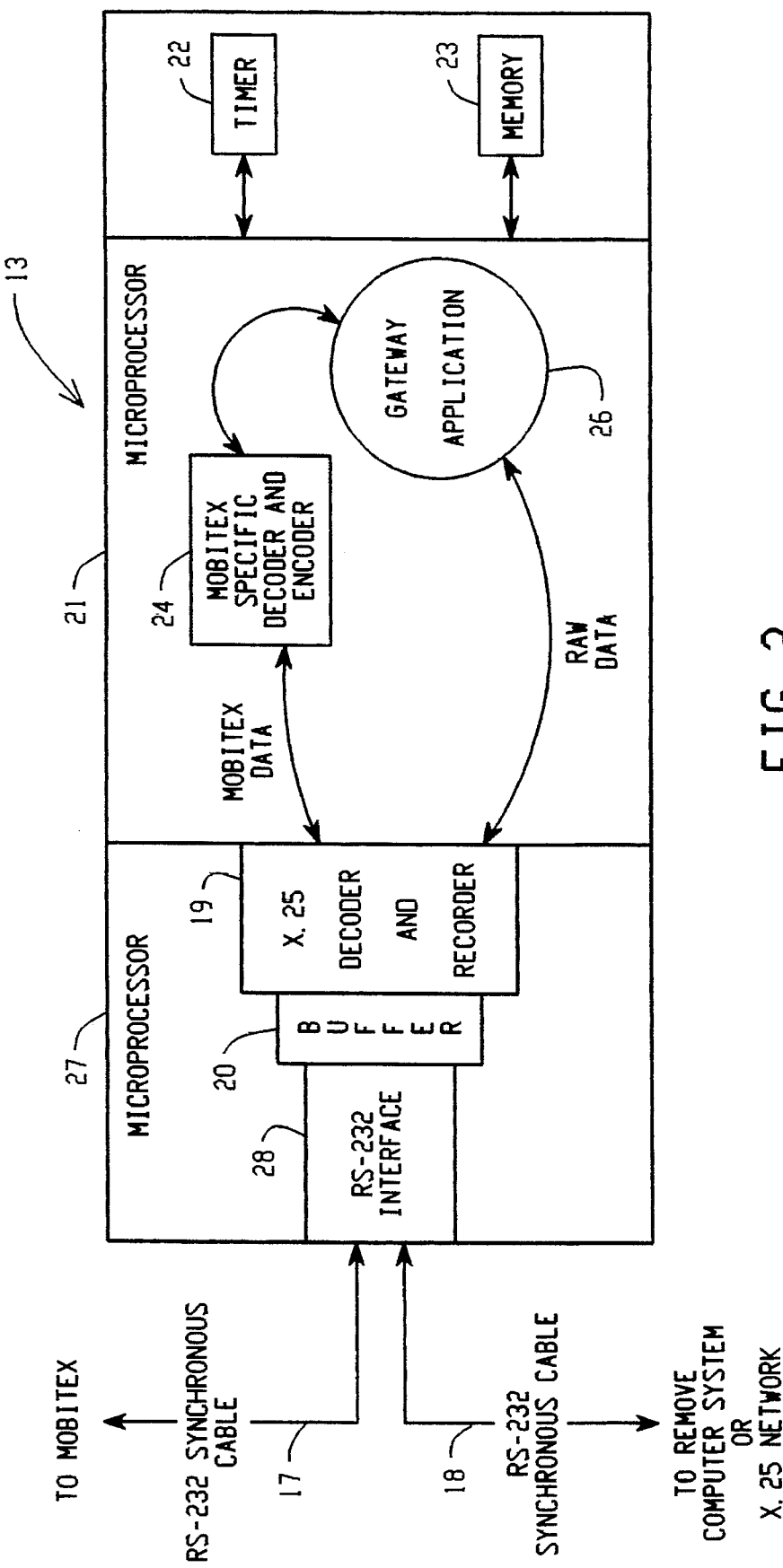
FIG. 2 is a general block diagram of the basic hardware components of a gateway device in accordance with the present invention suitable for use with a wireless communication network.

FIG. 2 is a general block diagram of a gateway 13 suitable for use with a wireless communication network such as Mobitex 12. As noted in FIG. 1, the gateway is connected to Mobitex 12 by an RS-232 synchronous X.25 connection 17 and to the remote computer system or X.25 network by an RS-232 synchronous X.25 connection 18. The two connections 17 and 18 are necessary unless the gateway 13 requires only one connection to reach both Mobitex 12 and all required remote systems 15. Normally, only one connection is required in the case where a public X.25 Data Network is attached to the gateway 13. As those skilled in the art are aware, only one connection is required if a separate multiplexing switcher (not shown) is used and the RS-232 connections 17 and 18 are any cable type capable of supporting X.25 synchronous communications including those commonly known as X.21 and V.35, as well as others.

As shown in FIG. 2, a microprocessor 27 reads in data as character streams and stores it as packets in the buffer 20. The X.25 Decoder and Encoder component 19 reads the X.25 packets out of the buffer 20 and performs the X.25 conversion to remove or add the X.25 protocol information. The RS-232 connection 28 and components 19 and 20 are often on a separate card with their own microprocessor 27 to maintain speed and throughput.

The Mobitex Specific Decoder and Encoder 24 processes data specifically received from or sent to the Mobitex wireless network 12. This Mobitex component 24 and the Gateway 13 Application 26 are programs executed in the main microprocessor 21. It is noted, that depending on the application, multiple microprocessors 21 may be used in gateway 13. The microprocessor 21 makes use of the timer component 22 for time related services and the memory component 23 for memory requirements. Memory requirements include both short term buffer requirements and long term disk storage of configuration parameters and script file information.

Figure 3:
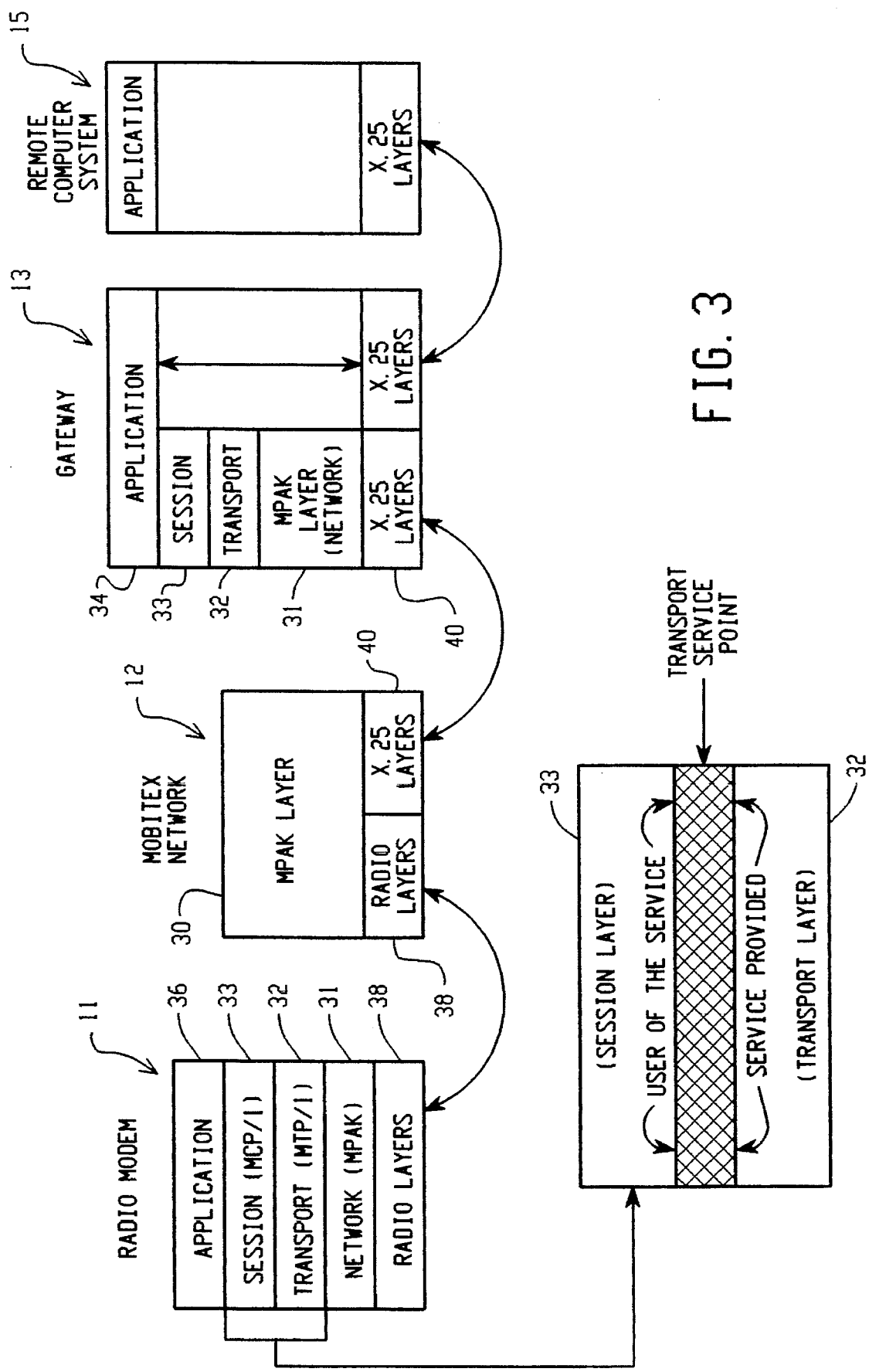
FIG. 3 is a block diagram showing the protocol layers involved in establishing and maintaining a connection between a DTE user and a remote computer system through a wireless communication network using a gateway in accordance with the present invention.

FIG. 3 is a detailed illustration of the various protocol layers involved in supporting an end-to-end connection between modem 11 and gateway 13 or another modem 11. Operation of the gateway 13 in conjunction with modem 11 and a remote computer system 15 involves several protocol layers. As those skilled in the art will appreciate, these layers work together as defined by the International Standard's Committee (ISO's) paper on Open System Interconnect (OSI). Each protocol layer has its own distinct header that enables it to perform its specific protocol functions. The exact format of each protocol, the service definition between the different layers, and the function of each protocol is set forth in a series of documents available from Ericsson Sweden and Eritel Sweden including:

a. Mobitex Terminal Specification (Reference 30 and 31) 001 53-03/L2BA 703 1001 Section: Mobitex Network Layers for Terminals S/1056-A-296 S171/0 Ue Eritel AB, Sweden
  b. Mobitex Transport Protocol, Release B (MTP/1) (Reference 32) Y/KL-91:754 1/115517-CALA 88215 By: Anders Olsson and Eddie Johansson Ericsson Mobile Communications AB
  c. Mobitex Transport Service Definition (Reference 32) AUR-92:760 By: Anders Olsson Ericsson Mobile Communications AB
  d. MCP/1 Mobitex Compression Protocol (Reference 33) ECS Y/G-93:0242 By: Jack De Winter Research In Motion, Waterloo, Canada and Ericsson AB, Sweden
  MCP/1 Mobitex Compression Service Definition (Reference 33) ECS Y/G-93:0241 By: Jack De Winter Research In Motion, Waterloo, Canada and Ericsson AB, Sweden As shown in FIG. 3, adjacent layers in a protocol stack make use of lower layers for services. The applications 34 and 36 on both sides of the Mobitex Network 12 connection make use of the session interface 33 to access a range of session services. There are three examples of these services: Session Open (Accept) Connection, Session Close Connection, and Session Send Data. The function of these services include opening a session, closing a session, and sending data through a session. The MCP/1 specifications, referenced above, completely defines each of these services.

The Session layer 33 makes use of the transport interface 32 to access a range of transport services, including, Transport Open Connection, Transport Close Connection, and Transport Send Data. The function of these transport services is to open a transport connection, close a transport connection, and send data through a transport connection. The MTP/1 specifications, referenced above, completely defines each of these services. The object of the transport layer 32 is to guarantee the delivery of data.

The transport layer 32 interfaces with the network layer 31 and makes use of the network layer services. The basic function of the network layer 31 is to build and interpret MPAKs. The radio protocol layers 38 implement ROSI and GMSK, which perform the modulation/demodulation required to convert data into the RF format used by Mobitex Network 12. ROSI is a method used to place data into small packets for transmission. GMSK stands for Gauss Mean Shift Keying and is simply a modulation technique used for modulating FM data on a radio signal.

Establishing and maintaining a connection between modem 11 and gateway 13 through network 12 involves each of the protocols shown in FIG. 3. For example, the gateway 13 passes data, as it arrives from network 12, through its X.25 layers, 40 and to its MPAK layer 31. As data arrives at MPAK layer 31, the data is checked to make sure it arrived in the correct format and then layer 31 passes the data to the Transport layer 32. The MTP/1-based Transport layer 32 looks at the MTP/1 message type, found in the first three bytes of the data, also called the message header, to determine how to process the MTP/1 message. Protocol messages exchanged between different Transport layers are called Transport Protocol Data Units (TPDUs) and follow the format documented in the MTP/1 specification referenced above. After Transport layer 32 decodes the TPDU, it passes the message up to Session layer 33 as a session message. Protocol messages exchanged between different Session layers are called Session Protocol Data Units (SPDUs) and follow the format documented in the MCP/1 specification referenced above. Session layer 33 interfaces with Application 34.

Figure 4:
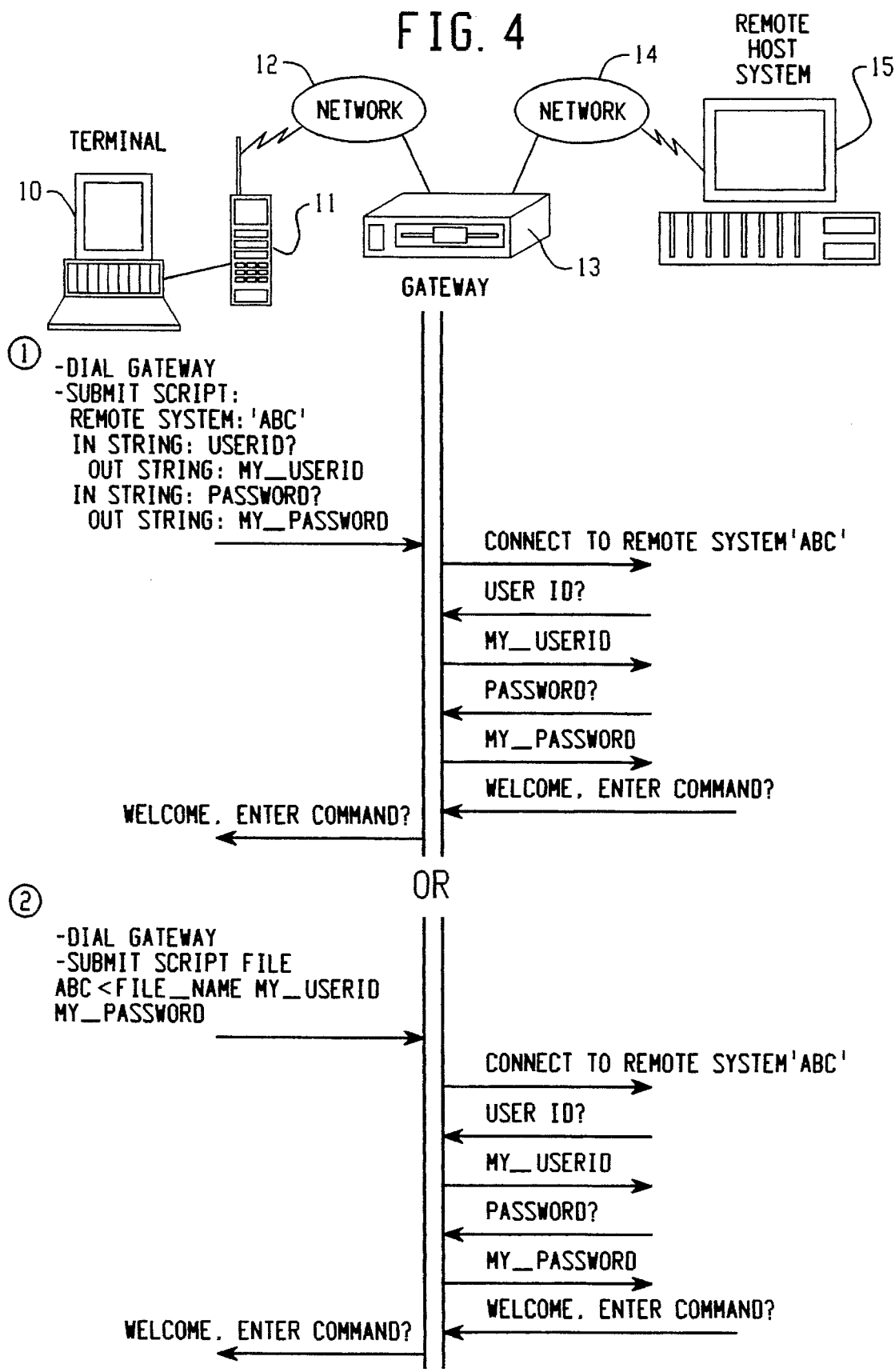
FIG. 4 is an overview diagram showing a sample message exchange which occurs when using gateway scripting at connection time.

FIG. 4 is an overview that shows two alternate sample message exchanges between the DTE 10 user and the remote computer system 15 at connection time when using gateway scripting. When the DTE 10 user initiates the connection he has the option of including the remote computer system 15's name and a series of scripting commands, as part of the connection request. The gateway 13 interprets the commands and uses them to solve the previously mentioned problems involved in bridging Mobitex 12 to existing X.25 networks 14. Generally, in the connection process, gateway 13 looks at the connection data for a host name in the script, allowing the gateway 13 to resolve the addressing problem previously discussed. The gateway 13 then matches the host name identifier against a range of known services and issues an X.25 network 14 call request to the matched service. In the next step of the connection process, gateway 13 looks at the connection data for further scripting components to filter host data and accelerate the connection process. This filtering technique, described in detail below, helps solve the problem of speed and usability. The script in the FIG. 4 exchanges includes the format of the remote system 15's login prompt, the response to the login prompt, the format of the remote system 15's password prompt, and the response to the password prompt. As shown in example 2 of FIG. 4, the DTE 10 user can store script commands in a file at the gateway 13 and invoke them by using a filename. By allowing the DTE 10 user to include a set of parameters for the script to use, he makes file invocation dynamic. In FIG. 4, these parameters specify the login name and the login password.

Figure 5:
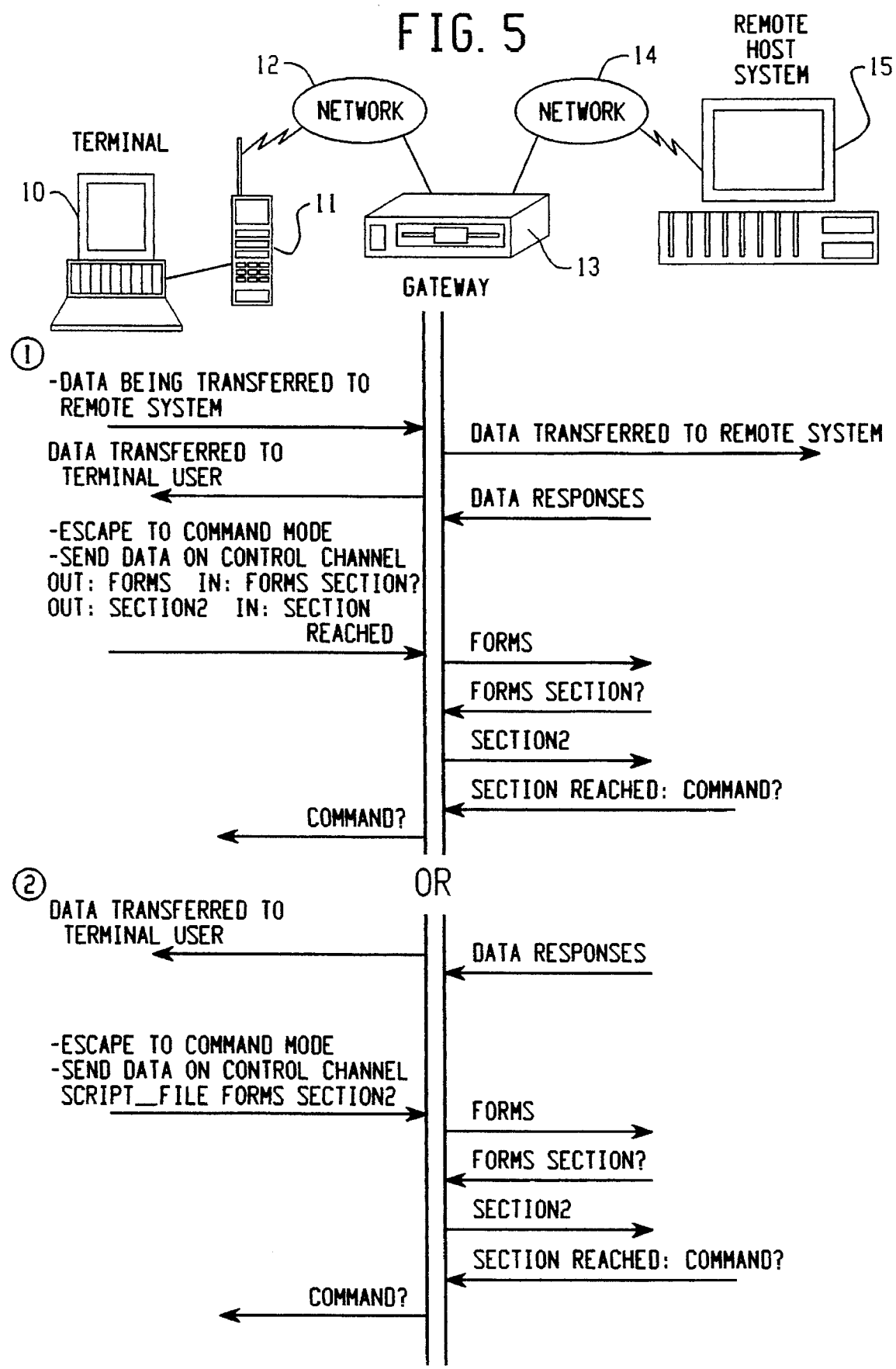
FIG. 5 is an overview diagram showing a sample message exchange which occurs when using gateway scripting after a connection is already established (data transfer state).

FIG. 5 presents a similar overview to FIG. 4 except that it takes place after connection has been established. In order to send a script command during the data transfer state, the DTE 10 user must exit to command mode in the modem 11 and issue a command which uses the MTP/1 qualified identifier. When the data arrives to the gateway 13 with the MTP/1 qualified identifier the gateway 13 is able to identify that a DTE 10 user gateway request is present. As previously discussed, these include scripting, file transfer, and session switching.

As shown in FIG. 5, the message exchanges are similar to the FIG. 4 message exchanges. In the first step in example 1, the gateway 13 sends a command to the remote computer system 15 in order to request some function of it. Then, as the remote system 15 sends data to the DTE 10 user, the gateway 13 filters it as instructed by the script commands. As shown in example 2, the script can be a file stored at the gateway 13. The DTE 10 user can invoke the file and pass arguments to perform the same filtering process.

Figure 6:
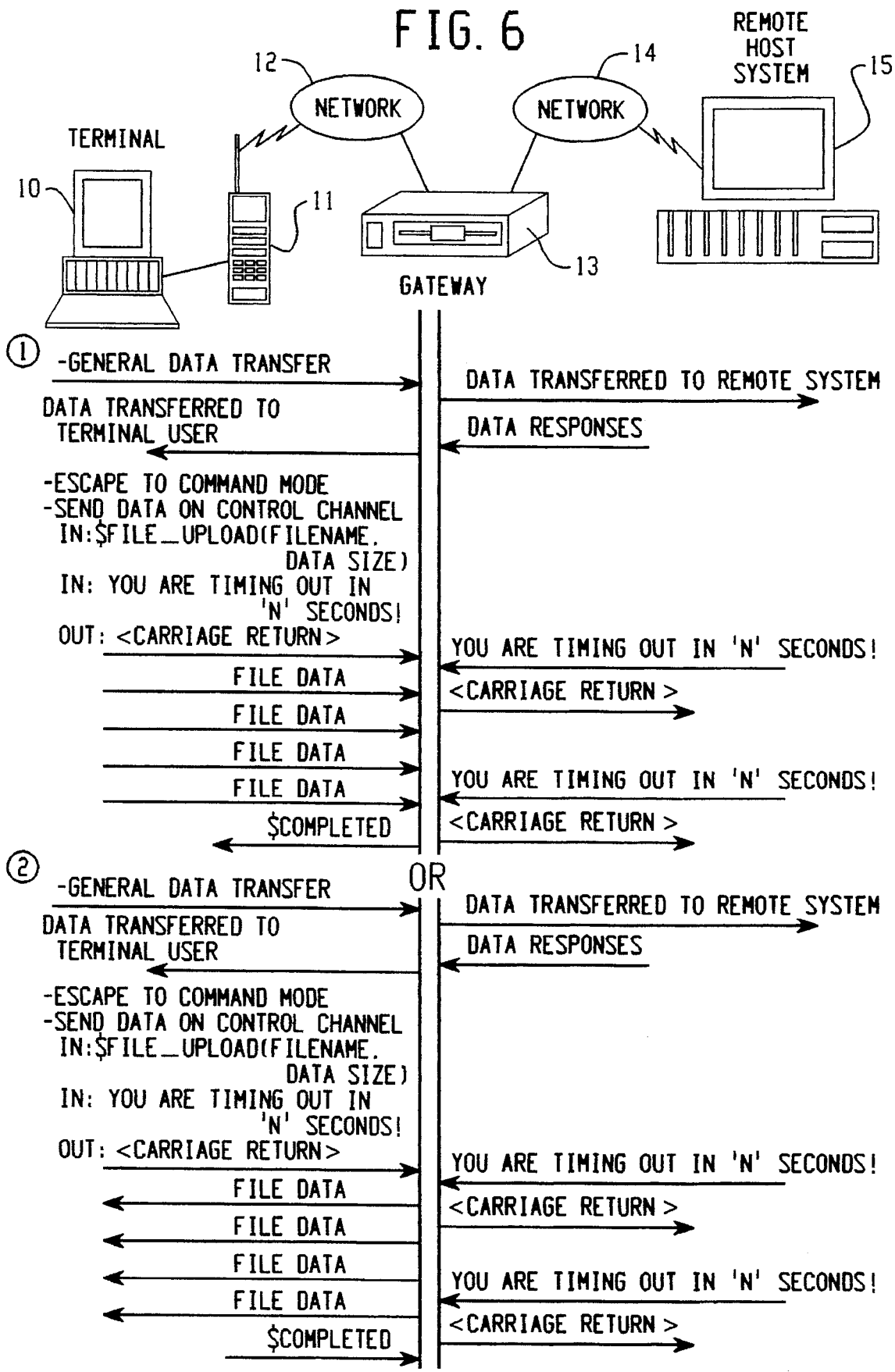
FIG. 6 is an overview diagram showing a sample message exchange that takes place when a file is exchanged between the gateway and the DTE user.

FIG. 6 is an overview that shows messages exchanged when a file passes between the gateway 13 and the DTE 10 user. The two examples in FIG. 6 show the DTE 10 user sending a file to the gateway 13 and receiving a file from the gateway 13. In both cases, the DTE 10 user initiates the process by sending a script command. The user can issue a command at connect time or during the online state. These examples show the file exchange during a data transfer state.

The first messages shown represent a normal message going between the DTE 10 user and the remote system 15. To leave this state the DTE 10 user issues a command, typically the standard '+++', to escape to command mode in the modem 11 and then sends a qualified data message with the file exchange command. The command, preferably, contains the filename, file size, and other file attribute information to produce a one direction file transfer. Script commands can also be present to ensure the remote system 15 does not timeout during the file exchange between the DTE 10 user and the gateway 13. This is because the exchange could take on the order of minutes and the remote system 15 is likely to disconnect the DTE 10 user if the DTE 10 user does not instruct it otherwise. The data in the exchange immediately follows this header. After the DTE 10 user or the gateway 13 sends or receives a continuous stream of messages containing this file, the receiver sends a final acknowledge command to inform the sender that all messages arrived successfully. At this point, the DTE 10 user can issue another script, file exchange, session switch command, or continue with his connection as before.

Figure 7:
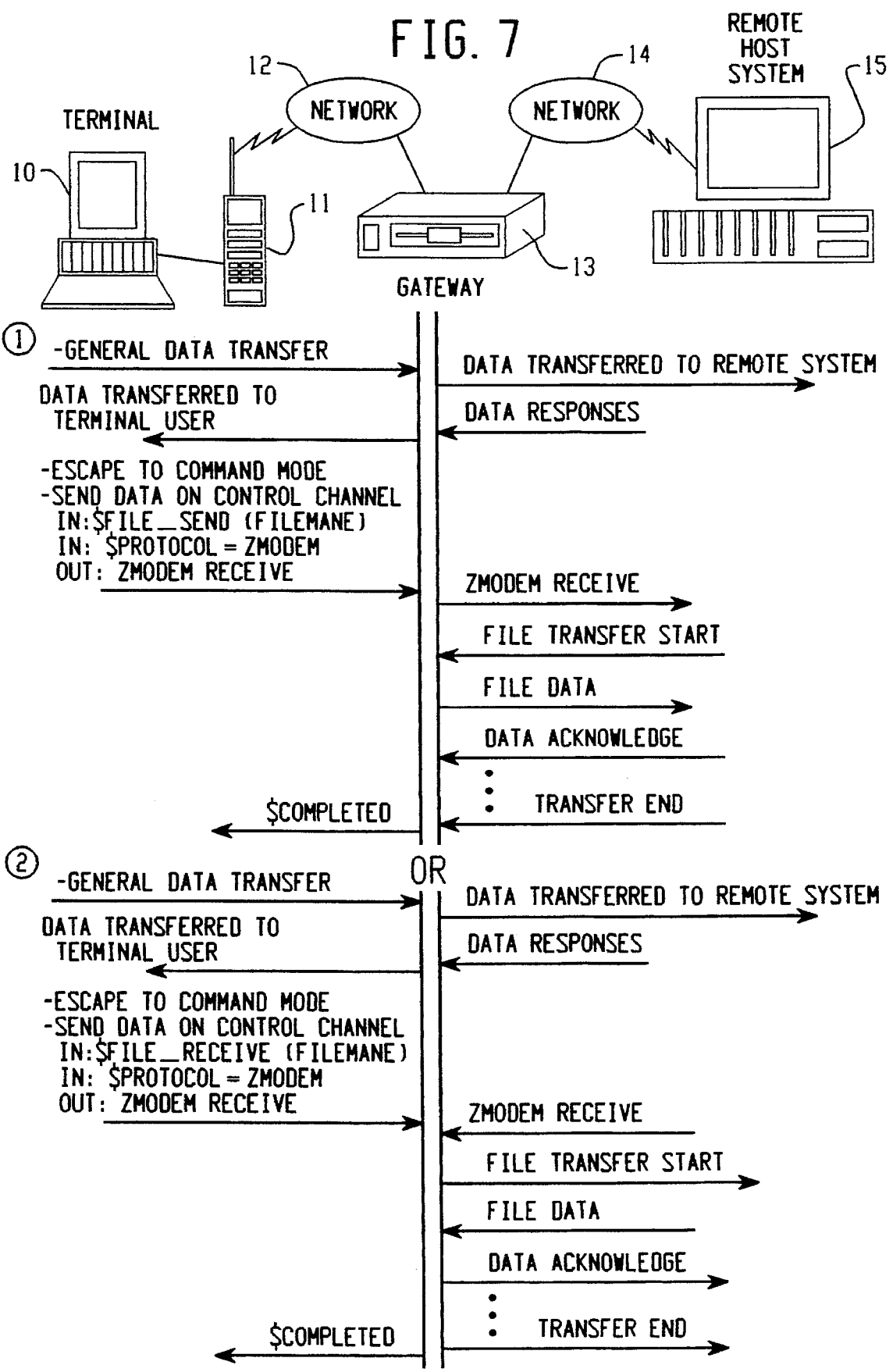
FIG. 7 is an overview diagram showing a sample message exchange that takes place when the DTE user instructs the gateway to exchange a file with the remote computer system using industry standard file transfer protocols.

FIG. 7 is an overview of the messages exchanged when the gateway 13 exchanges a file with the remote computer system 15 after the DTE 10 user requests a file transfer protocol. Some typical transfer protocols used and commonly found in the computer industry include: XMODEM, ZMODEM, YMODEM, YMODEM-BATCH, SEALINK, UUCP. In this message procedure, the DTE 10 user initiates the file exchange. Once the user requests the given file transfer, the gateway 13 will enter into a file send state or into a file receive state with the remote computer system 15. Either the gateway 13 or the remote system 15 will send a data acknowledge and transfer end command to confirm that the file transfer is complete and to end the transfer session. The gateway 13 then informs the DTE 10 user of this completion.

Figure 8:
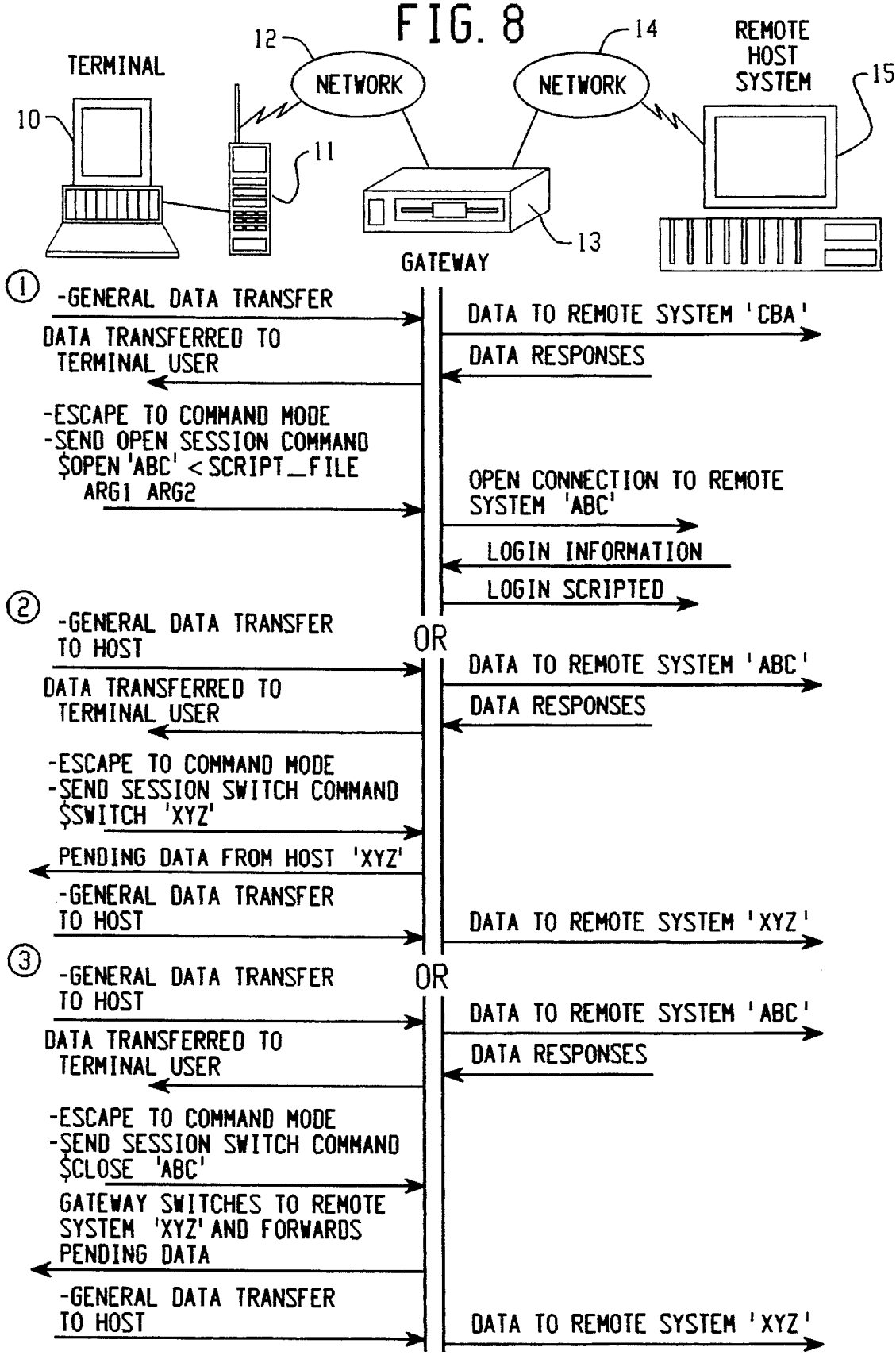
FIG. 8 is an overview diagram showing 3 sample message exchanges that take place when the DTE user invokes session switching.

FIG. 8 is an overview diagram showing sample message exchanges that take place when the DTE 10 user invokes session switching. As shown, three different scenarios are possible when the user requests session switching. In example 1, the user is in a data transfer state with a Remote Host System 15, called CBA. At some point during this normal data exchange, the DTE 10 user can choose to switch to Command Mode, typically using the standard '+++' escape sequence, and use the Open Session Command to connect to another service found on Network 14. The Open Session Command contains the new host system 15's name, in this case ABC, to connect to and can optionally be accompanied by a script file. This request is sent to the gateway 13 which then opens a connection with the specified remote host system 15. The System 15 sends back login information to the gateway 13 which can then script the login sequence if the remote system 15 provided a script file or script commands. The advantage provided by Session Switching is that the user can have open connections with several remote systems 15 at the same time and "switch" between all of them at anytime. Example 2 for Session Switching, found in FIG. 8, can occur after the DTE 10 user is in a data transfer state with a remote host system 15, the DTE 10 user switches to Command Mode and issues the session switch gateway command. This command suspends the current session and makes the requested session the currently active session. The gateway 13 then forwards any pending data on that session to the DTE 10 user. After the switch, the terminal 10 is in a general data transfer with the new remote system 15. In example 3, which is illustrated in FIG. 8, the DTE 10 user escapes to command mode to close one of several sessions. If the user closes the last session he disconnects from the gateway 13. Otherwise, if more than one session exists the gateway 13 will assign the user a new session and send any pending data for this session.

Figure 9:
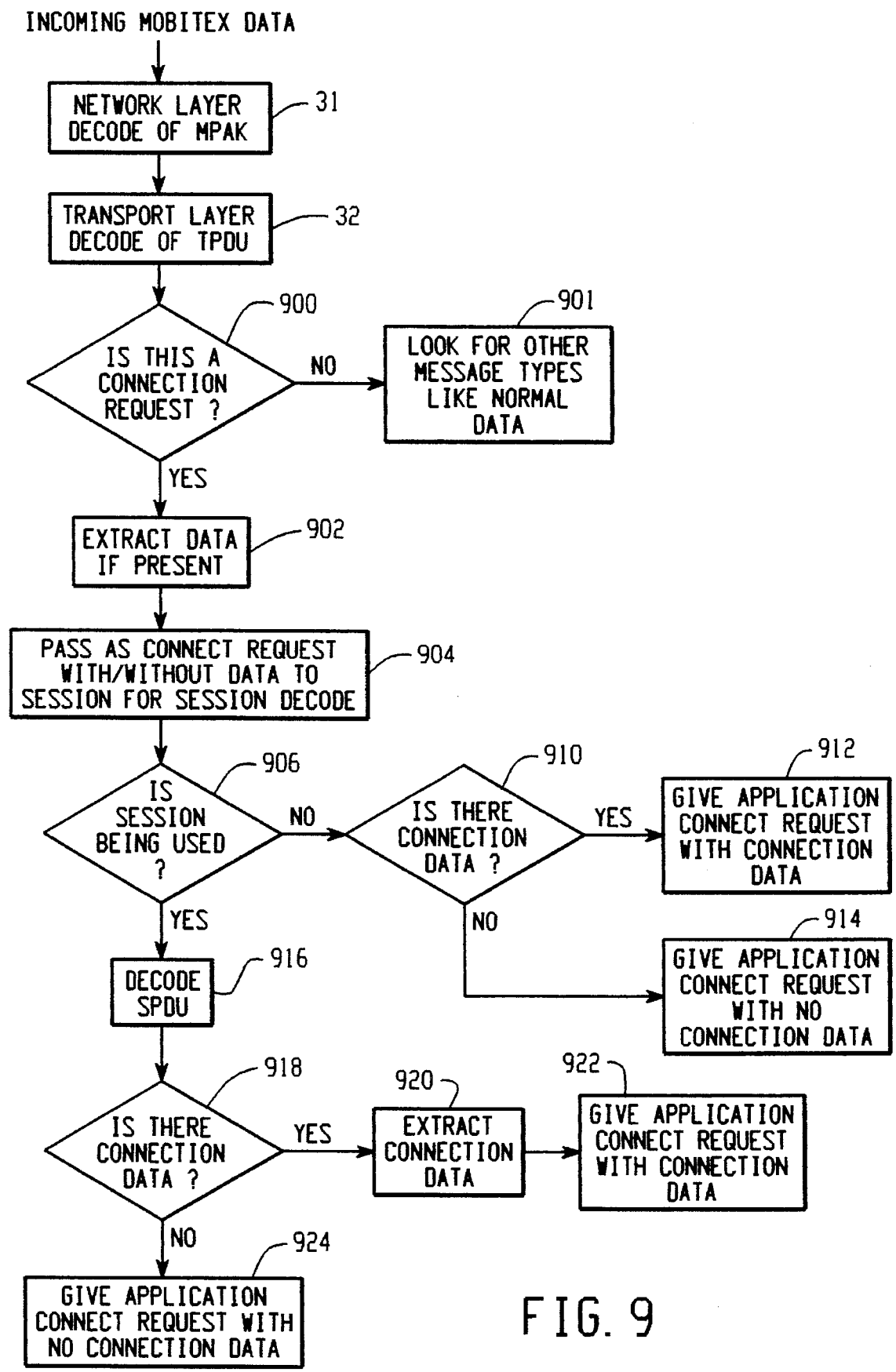
FIG. 9 is a state diagram illustrating the preferred method to decode a Mobitex connection request.
Figure 10:
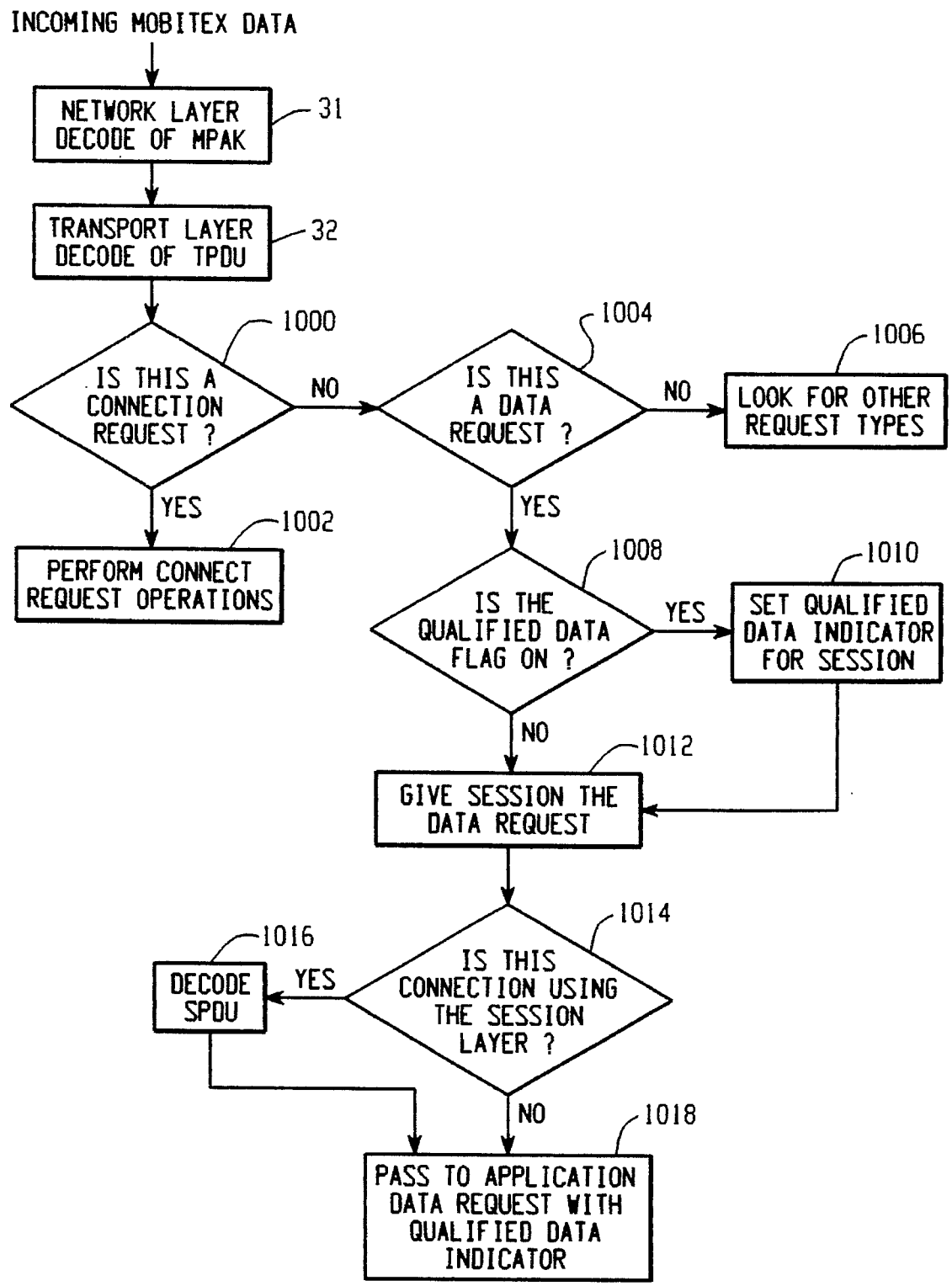
FIG. 10 is a state diagram illustrating the preferred method to decode a Mobitex data packet.

State diagrams in FIGS. 9 and 10 show the preferred method for decoding Mobitex packets (MPAKS). FIG. 9 discloses decoding a connection MPAK, and FIG. 10 discloses the decoding of data packets.

Referring now to FIG. 9, as the Mobitex data arrives the Network Layer 31 decodes the data. This layer 31 preferably follows the Network Layer specification, given in the list of Ericsson and Eritel references previously mentioned, to perform its decoding and encoding functions on the MPAK. The data portion of the MPAK, along with the source and destination Mobitex Access Numbers (MAN) then pass on to the Mobitex Transport Layer 32 (MTP/1). The data exchanged at this layer 32, called a Transport Protocol Data Unit (TPDU), is decoded and encoded following the MTP/1 specifications included in the above references.

Next, step 900 determines if the data contains a connection request. If a connection request is present the Transport Layer 32, at step 902 extracts any connection data accompanying this request. This connection data may be either session data or connection data. If a Mobidem-AT product is used as modem 11 the Session and Compression layer functions are optional. If the data does not contain a connection request step 901 causes the program to look for other message types, such as normal data.

After step 902, the Transport Layer 32 passes a connection request, at step 904, with any data present to the Mobitex Session/Compression layer 33 (MCP/1) for decoding.

Once the layer 33 receives the connection request, the program at step 906, causes layer 33 to look at the start of the data to determine if the initiating side is requesting MCP/1 services. The layer 33 at step 906 looks for a known header sequence in the data and also uses the MCP/1 specifications, given in the list of references above, to perform encoding and decoding functions.

If the Mobitex data packet is not requesting any MCP/1 services then, at step 910 a check is made for connection data. If the answer to step 910 is yes then the application 34 receives a connection request with data at step 912; otherwise application 34 receives a connection request with no data at step 914. If, however, at step 906, the data packet contains a Session Protocol Data Unit (SPDU) then the Session/Compression Layer 33 proceeds to decode this unit, at step 916. After decoding the SPDU, the Session Layer 33 determines if there is connection data for the application 34 at step 918. If connection data is present the Session Layer 33 extracts the data at step 920 and transfers the data to the application 34 as a connection request with data at step 922; otherwise, the Session Layer 33 gives the data to the application 34 as a connect request with no data at step 924.

In FIG. 10 the Network Layer 31 in the Protocol Stack decodes and encodes the MPAKS that it exchanges with the Mobitex communication network. Messages received from Mobitex are decoded and then passed to the Transport Layer 32 for decoding of the TPDU. Next, step 1000 determines if the Mobitex data contains a connection request. If there is a connection request the procedure, as explained in FIG. 9, steps 902–924, is followed at step 1002. Step 1004 ash if the message is a data request. If the answer is no the program proceeds to step 1006 to look for other request types. If, however, step 1004 determines that there is a data request the program proceeds to step 1008 to determine if the qualified data flag is on identifying the data as a control message designated for the gateway 13 not the remote system 15 currently receiving data from the DTE 10 user. If the qualified bit is on, step 1010 sets an indicator or flag to accompany the data from then on. If the answer to step 1008 is no or after step 1010 the message and qualified data indicator are then passed to the Session Layer 33 as a data message at step 1012. The program then proceeds to step 1014 to determine if the data is to be processed by Session Layer 33, i.e. contains an SPDU. If the MPAK contains an SPDU the Session/Compression Layer 33 decodes the unit at step 1016. If the answer to step 1014 is no or after step 1016 the program then passes the application data and any qualified data indicator to the application at step 1018.

Figure 11B:
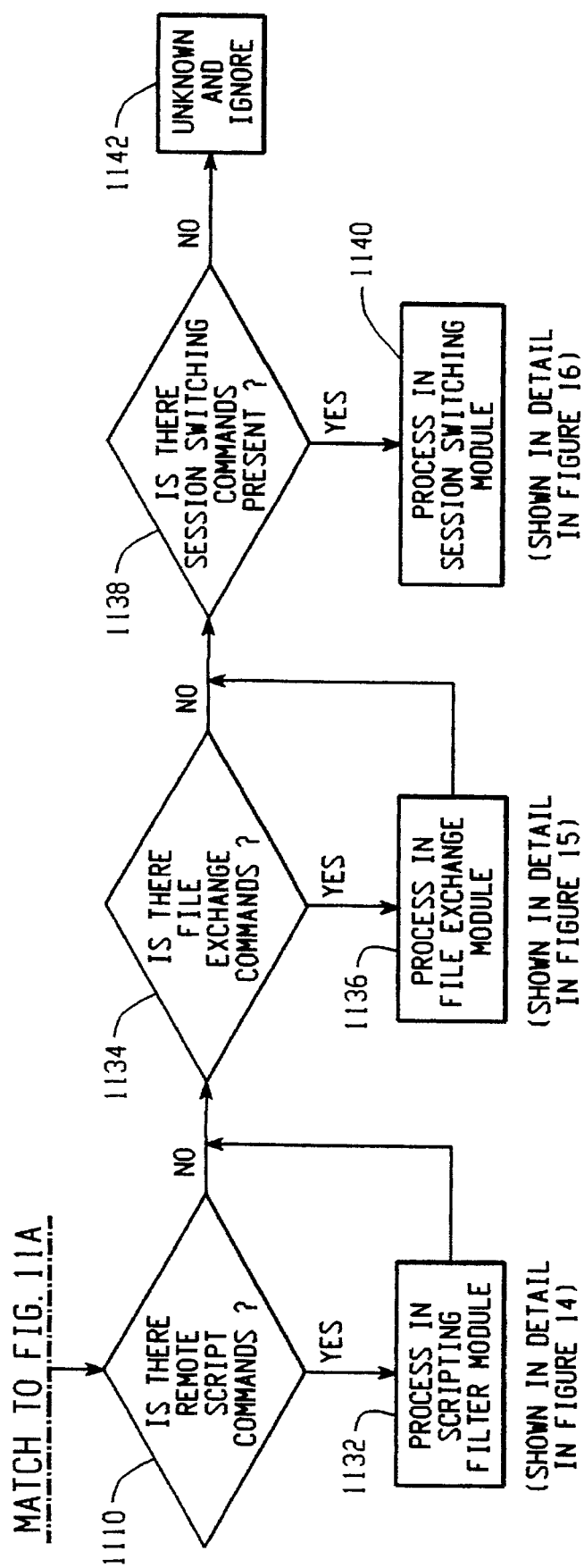
FIG. 11 is a state diagram illustrating the preferred method of determining if the DTE user wishes to access a remote control function.

FIG. 11 shows the preferred method for the DTE 10 user to control the gateway 13 functions. The Session/Compression Layer 33 generates and sends application requests into the gateway 13's Application component 34. There are many types of application requests, though for illustrative purposes, connection requests, data requests, and close requests will be discussed.

If at step 1100 the Application Layer 34 determines a connection request has been received the program then moves to step 1102 to check for connection data. If no connection data is present the gateway 13 program provides the DTE 10 user with the service menu of all known host services at step 1104. Otherwise, if connection data is present the gateway 13 program extracts the remote host system 15's name at step 1106. After the gateway 13 program calls the requested host, at step 1108 the remaining data is passed as a gateway control command to the next stage of gateway functions at step 1110.

If there was no connection request at step 1100 the program then asks, at step 1112, if the request contains a data request. If yes, the gateway 13 program checks to see if the qualified data indicator is on at step 1114. If the qualified data indicator is off then the data passes to step 1116 where the data is sent to the file transfer sub-system and then, at step 1118, on to the remote computer system 15 for processing. The file transfer sub-system filters the data in case the data is part of a DTE 10 user to the gateway 13 file transfer. If at step 1114 the data is qualified the data is then passed to step 1110.

If step 1112 determines there is no data request then step 1120 determines there is a close request. If the request is a close request (C) then the gateway 13 program proceeds to step 1122 and asks if this is a close response (i.e. did remote system 15 initiate the close?); otherwise the program proceeds to step 1124 to look for other requests. If the remote system 15 initiated the close then the program proceeds to step 1126 and the connection entry for this session is returned to memory, all session script filters are deleted, and all other close functions are performed. Otherwise, if the step 1122 determines that this is not a close response, the program marks the entry as "closing" at step 1128 pending a close confirmation from the remote computer system 15. The closing state disables any remote gateway commands and terminates DTE 10 user gateway functions. Step 1130 then sends the close request to remote system 15.

Returning to step 1110 the program determines if there are remote script commands in the data. If there is a remote scripting command then the request passes to the scripting filter module at step 1132. The scripting filter module is defined in detail in the discussion of FIGS. 13 and 14. If, at step 1110, there are no remote script commands the program determines if there are file exchange commands, at step 1134. If the command is a file exchange command then the request passes to the file exchange module at step 1136 which is defined in detail in conjunction with FIG. 15. If the answer to step 1134 is no step 1138 ash if there are session switching commands. If the command is a session switching command then the request goes to the session switching module at step 1140 which is defined in FIGS. 16A and 16B. If the answer at step 1138 is no the program then ignores the data at step 1142.

All three commands shown in steps 1110, 1134, and 1138 can be present in one request and each is checked for and processed sequentially as indicated.

Figure 12:
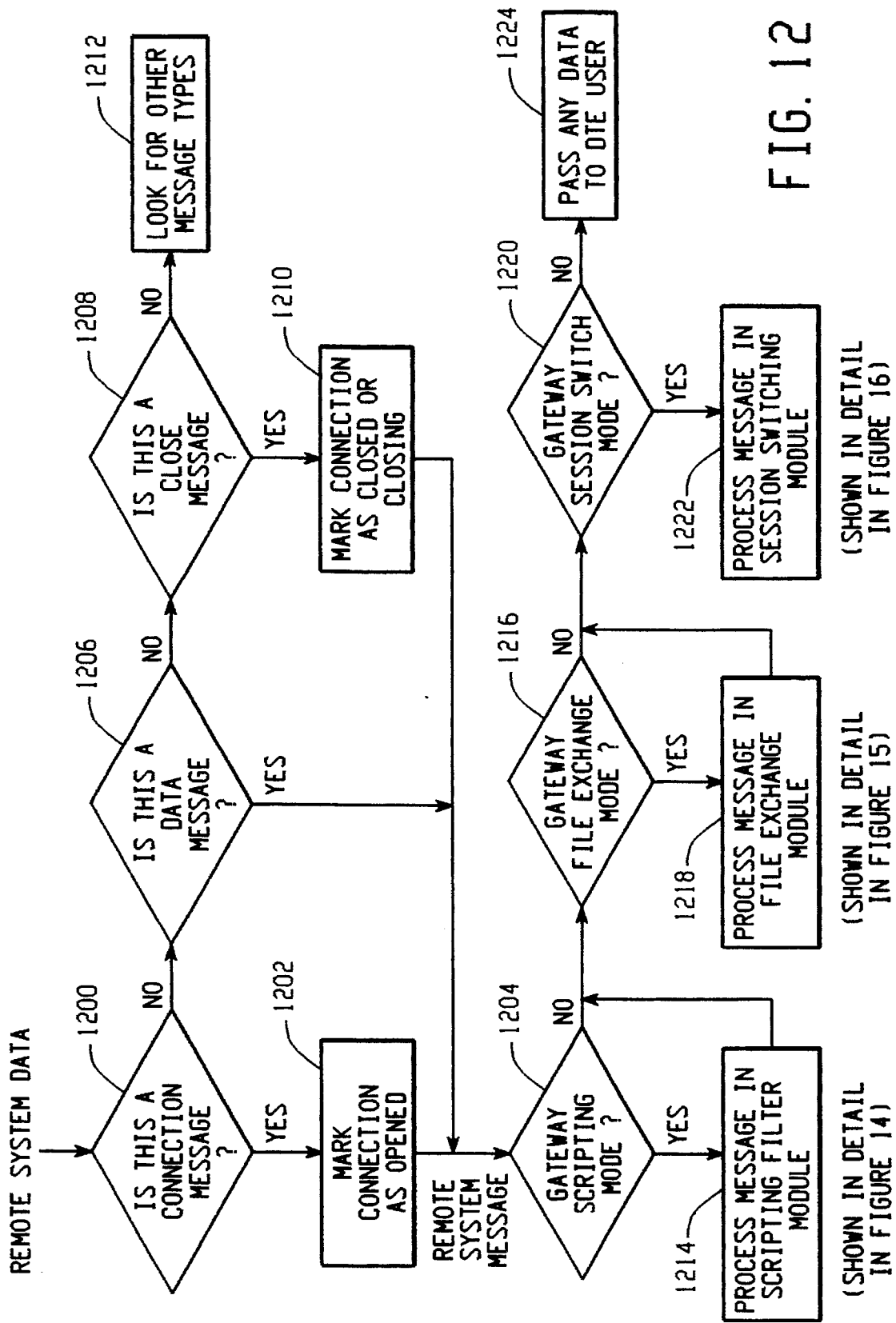
FIG. 12 is a state diagram illustrating the preferred method for processing data that the remote computer system sends.

FIG. 12 is the preferred method for processing incoming data from the remote computer system 15. The gateway 13 program checks for a series of message types to see if they match. If at step 1200 the message is determined to be a connection message (including connection confirmations, for connections initiated by the gateway 13) then the gateway 13 marks the connection as opened at step 1202 and passes the message to step 1204. However, if there is no connection message at step 1200 the program proceeds to step 1206 to determine if there is a data message. If the message is a data message then the message passes to step 1204 directly. Otherwise, if there is no data message at step 1206 and if at step 1208 the message indicates a close request (a close response for closes initiated by the gateway 13) then the gateway 13 program marks the connection entry as closing or closed at step 1210 before passing the message to step 1204. If there is no close request at step 1208 then step 1212 looks for other message types.

In steps 1204 and 1214–1224 the gateway 13 program determines if the DTE 10 user has activated any remote gateway functions. Step 1204 determines if the gateway scripting mode is on and if yes the message passes to the scripting filter module at step 1212 described in detail in conjunction with FIG. 14. After step 1214 or if there is no gateway scripting step 1216 determines if the file exchange mode has been activated. If the DTE 10 user has activated file exchange mode then the gateway 13 program gives the message to the file exchange module at step 1218. After step 1218 or if the answer to step 1216 is no step 1220 determines if the gateway session switching mode is activated. If the DTE 10 user has activated the session switching mode the gateway 13 program sends the message to the session switching module at step 1222. If the gateway session switching mode is not activated any data is passed to the DTE 10 user, at step 1224. As can be seen each message is checked sequentially for the various functions since the DTE 10 user may be running more than one function at a time.

Figure 13:
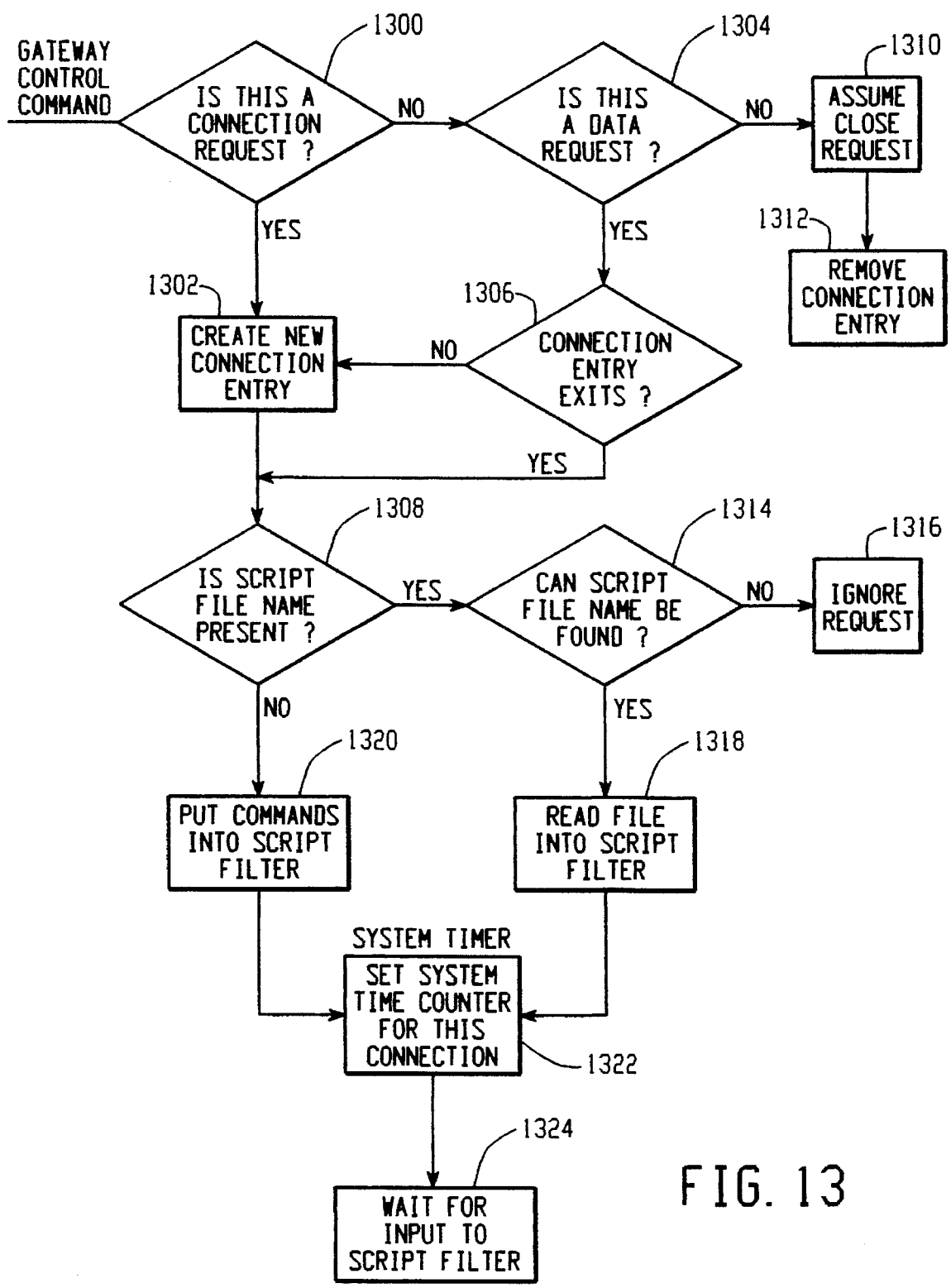
FIG. 13 is a state diagram illustrating the preferred method for decoding a DTE user scripting request and building a script filter.

FIG. 13 discloses the preferred method for creating a gateway script filter. Gateway script filters parse incoming remote system 15 data to produce simulated user responses to expected questions from a remote computer system 15. If, at step 1300, the gateway control command is determined to be a connection request then the gateway 13 program creates a new connection entry at step 1302 to hold the script commands. If there is no connection request then the gateway 13 program determines if there is a data request at step 1304 then at step 1306 the program checks to see if a connection entry already exists. If a connection entry does not exist then the gateway 13 program creates a connection entry at step 1302. It is noted that the connection entry may exist because a previous script may still be running and the DTE 10 user can add or extend the script dynamically. Then the gateway 13 program parses the gateway control commands found in the data request into the connection entry and proceeds to step 1308. Finally, if the request is not a connection or data request then the program assumes the request must be a close request at step 1310 and then the program removes the connection entry at step 1312.

Step 1308 checks for a scripting file name. If a filename exists then the gateway 13 program verifies the name against an actual file at step 1314. If the gateway 13 finds no filename at step 1314 the request is ignored as indicated at step 1316. Otherwise, the scripting module reads the file, parses the command in the file, and puts it into a script filter at step 1318. If no file is specified at step 1308 the gateway 13 program immediately parses the script commands included with the data and puts them in a script filter at step 1320. After completion of step 1318 or 1320 the program sets the system time counter at step 1322. Once the script filter is built and the scripting mode is turned on, the gateway 13 program waits for inputs to the script filter at step 1324. The scripter sets the system time counter so that if the expected remote system 15 responses do not arrive then the connection can be cleaned up. Further details on scripting inputs are shown and described in FIG. 14.

Figure 14A:
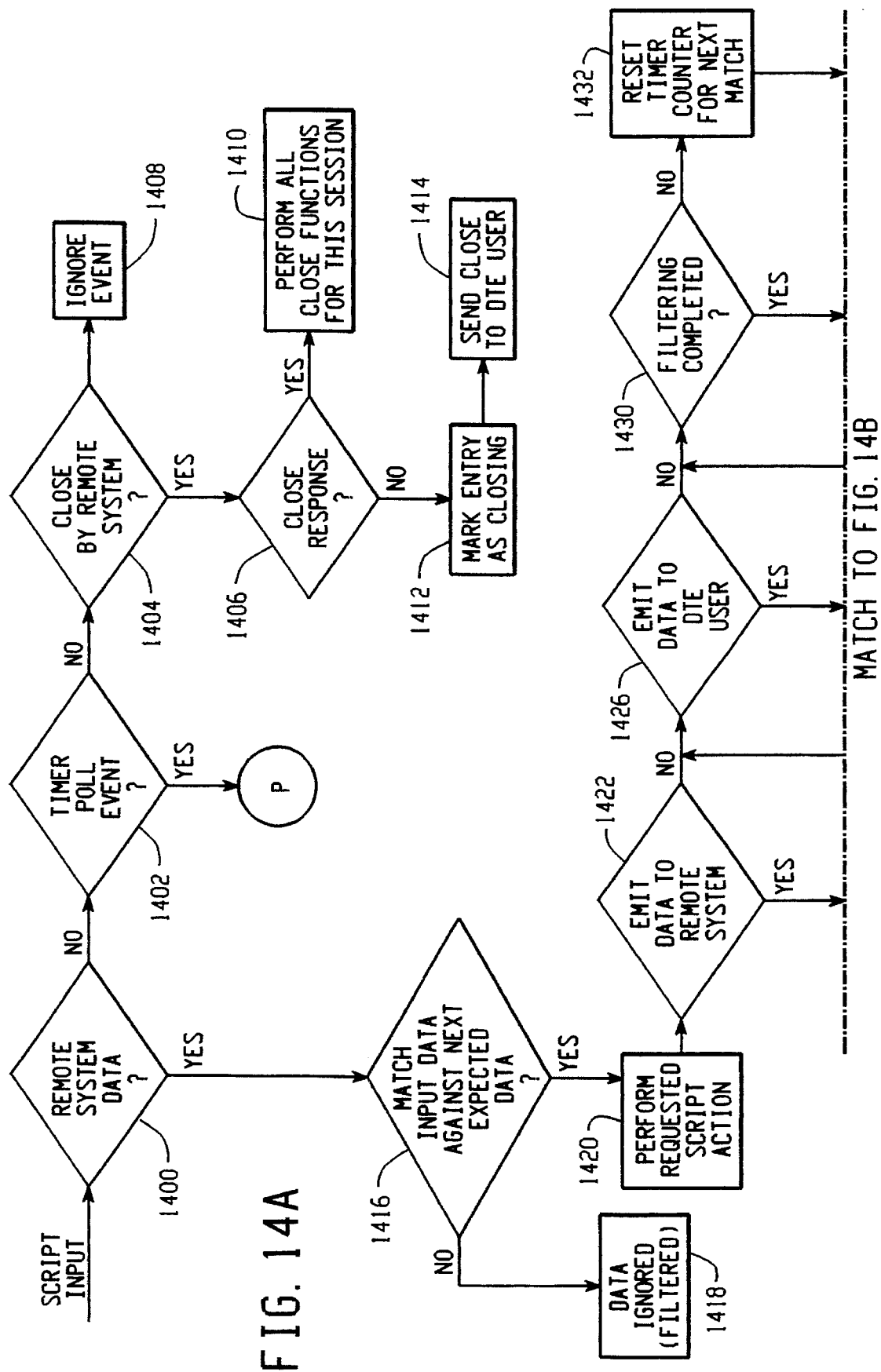
FIG. 14 is a state diagram illustrating the preferred method for processing all inputs to the scripter once the gateway builds a script filter.
Figure 14B:
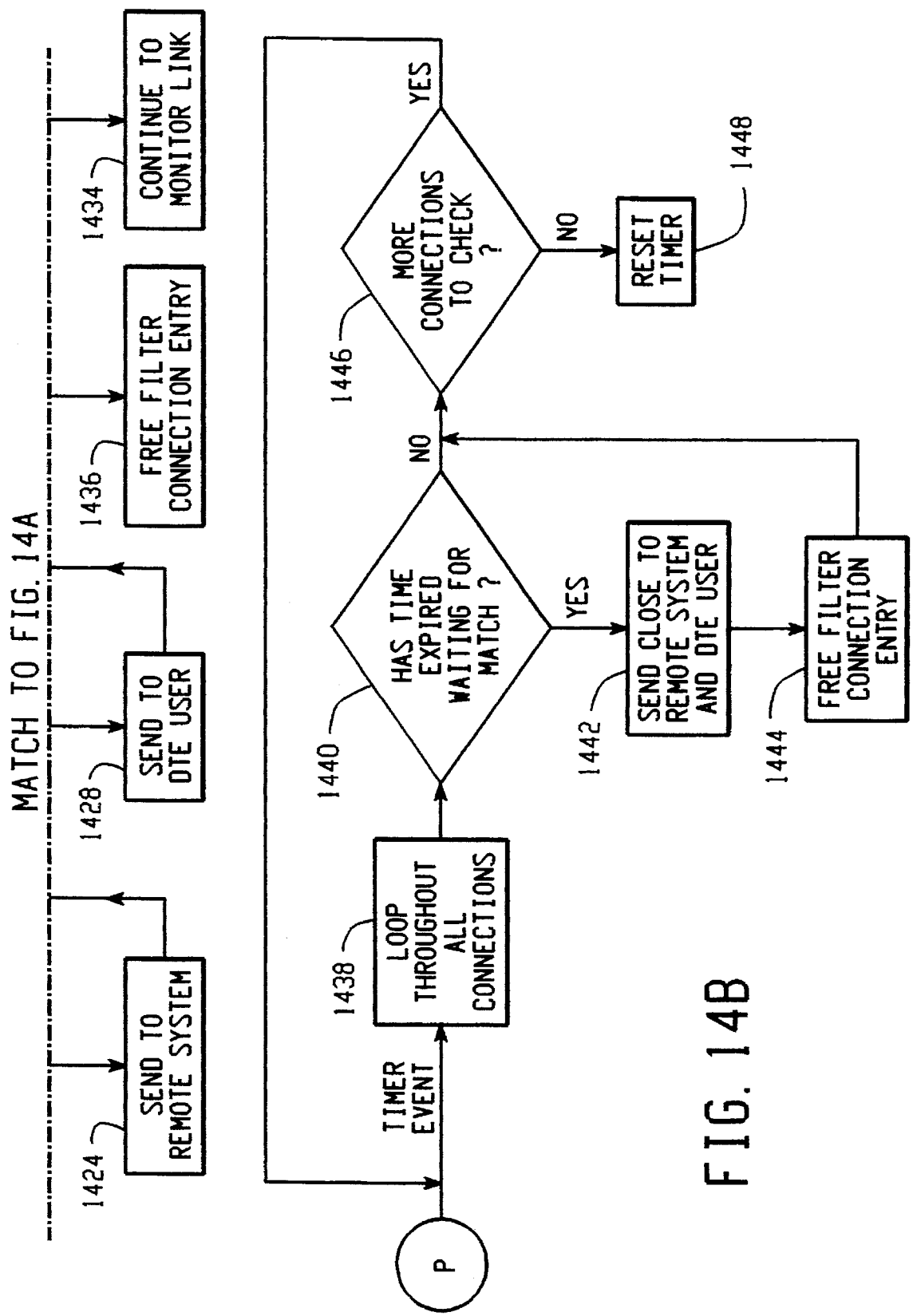

FIG. 14 discloses the preferred method of processing inputs to the gateway scripting module. The gateway 13 program uses these inputs to drive the scripting module. In this diagram, these inputs include remote system 15 data, a system then poll, and a close from the remote system 15. Most importantly, based on the discussion of the previous figures, inputs only arrive at this level if the DTE 10 user has requested scripting. As timer messages or script input arrives into this module, it checks for remote system 15 data at step 1400. The gateway 13 program, preferably performs this check first since this is the most frequently received data. If step 1400 determines the script input is not remote system 15 data the gateway 13 program checks if there is a timer poll event at step 1402. If there is a timer poll event the gateway 13 program sets and resets timers when scripting starts so that it can determine when a script has failed, as explained below, and if there is no timer poll event the program checks for close messages from the remote system 15 at step 1404. When the program does receive a close from the remote system 15 the gateway 13 program checks to see if it is a close response at step 1406; otherwise the program ignores the event, as indicated at step 1408. If it is a close response (DTE 10 user initiated the close) then the connection entry is returned to memory and all necessary session close functions are performed at step 1410. Otherwise, the entry is marked as 'closing', at step 1412 and a close is sent to the DTE 10 user, at step 1414. During the closing state all remote gateway functions are, preferably, disabled and the mode settings are cleared.

If the gateway script filter at step 1400 receives remote system 15 data then the program, at step 1416, attempts to match this data against the next expected data string that the DTE 10 user programs through script commands. As those skilled in the art will appreciate gateway 13 could use a wide range of script commands and script languages in any number of languages and techniques to specify strings or prompts to compare against remote system 15 data. Additionally, several alternative data strings may be present for matching against a given input string from the remote system 15. The gateway 13 script filter checks each possible data string, in turn, before the filter or program considers the comparison a failure. If the program does not find a match for the string received the gateway 13 filter ignores or filters the data as indicated at step 1418. Ignoring the data means that the gateway 13 filter does not save the data, nor is the data passed on to the DTE 10 user—the data is simply deleted. By using this technique, the gateway 13 keeps extraneous data from being sent over the slow and costly Mobitex link and thereby speeds up data transmission and saves the user money.

If the remote system 15 data at step 1416 finds a match in the remote system 15 data for the set of next expected strings then it takes further scripting action at step 1420. The DTE 10 user can program the gateway 13 through scripting to perform a range of functions on a match. These functions include emitting data to the remote system 15, as determined at step 1422. If the data is to be emitted to remote system 15 step 1424 causes the data to be sent. After step 1424 or if the answer to 1422 is no then step 1426 determines if the data is to be emitted to the DTE 10 user. If the answer to step 1426 is yes step 1428 sends the data. After step 1428 or if the answer to step 1426 is no then step 1430 determines if the filtering is complete. If filtering is not complete the gateway 13 program resets the script time counter for this connection at step 1432. The DTE 10 user, preferably, can adjust the time counter to set the time to wait for a match string before closing the connection. As indicated at step 1434, the program continues to monitor the link for any additional data. If at step 1430 the gateway 13 program completes filtering step 1436 frees the filtering portion of the connection entry, holding all pertinent scripting information, and stops the filtering process. Step 1436 allows data to flow freely between the DTE 10 user and the remote system 15.

If step 1400 determines the script input received is not remote system 15 data then the gateway 13 program checks for a timer poll event at step 1402. As previously discussed, for each active connection currently using scripting, the gateway 13 sets a counter to ensure that if the submitted script fails, the gateway 13 will terminate the connection. At gateway 13 initialization the poll timer is run for the scripting module for all sessions. When step 1402 determines that there is a timer poll event then the gateway 13 program proceeds to step 1438 and checks all connections. As the program loops through all the connections, the program decrements each connection time counter and at step 1440 checks for expired counters (i.e., counters that have reached zero). If a timer has reached zero the gateway 13 filter at step 1442 sends a close message to the remote system 15 and to the DTE 10 user to inform them of the scripting failure. After step 1442, the filter, at step 1444, closes the connection entry for this scripting attempt and continues to step 1446. If, at step 1440 the time has not expired the filter, at step 1446 determines if there are more connections to check and if there are loops back to step 1438. Otherwise, the filter exits the loop and resets the system timer to prompt the scripter after a predetermined interval, at step 1448.

Figure 15A:
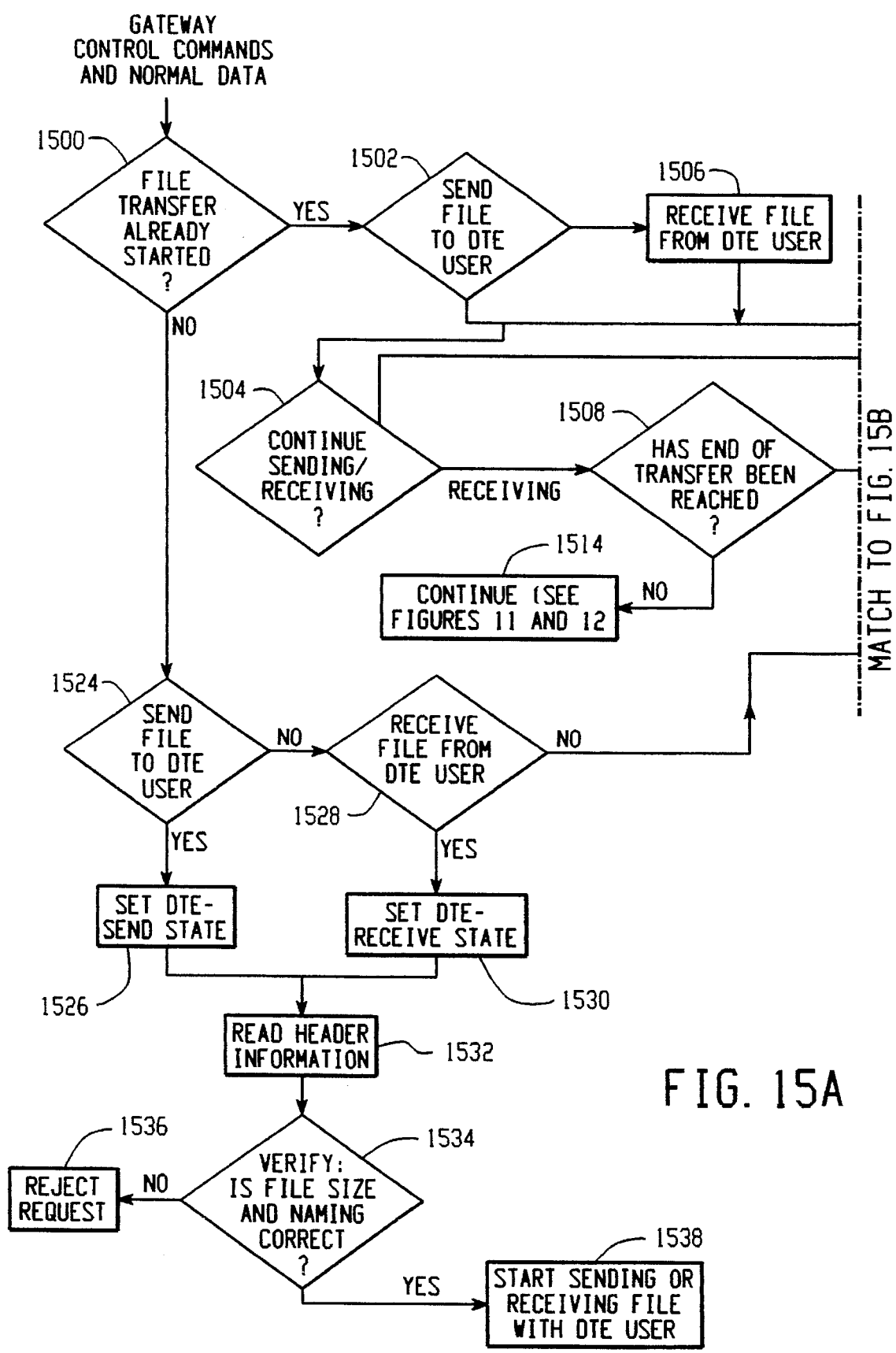
FIG. 15 is a state diagram illustrating the preferred method for processing inputs when performing a DTE user file transfer request.
Figure 15B:
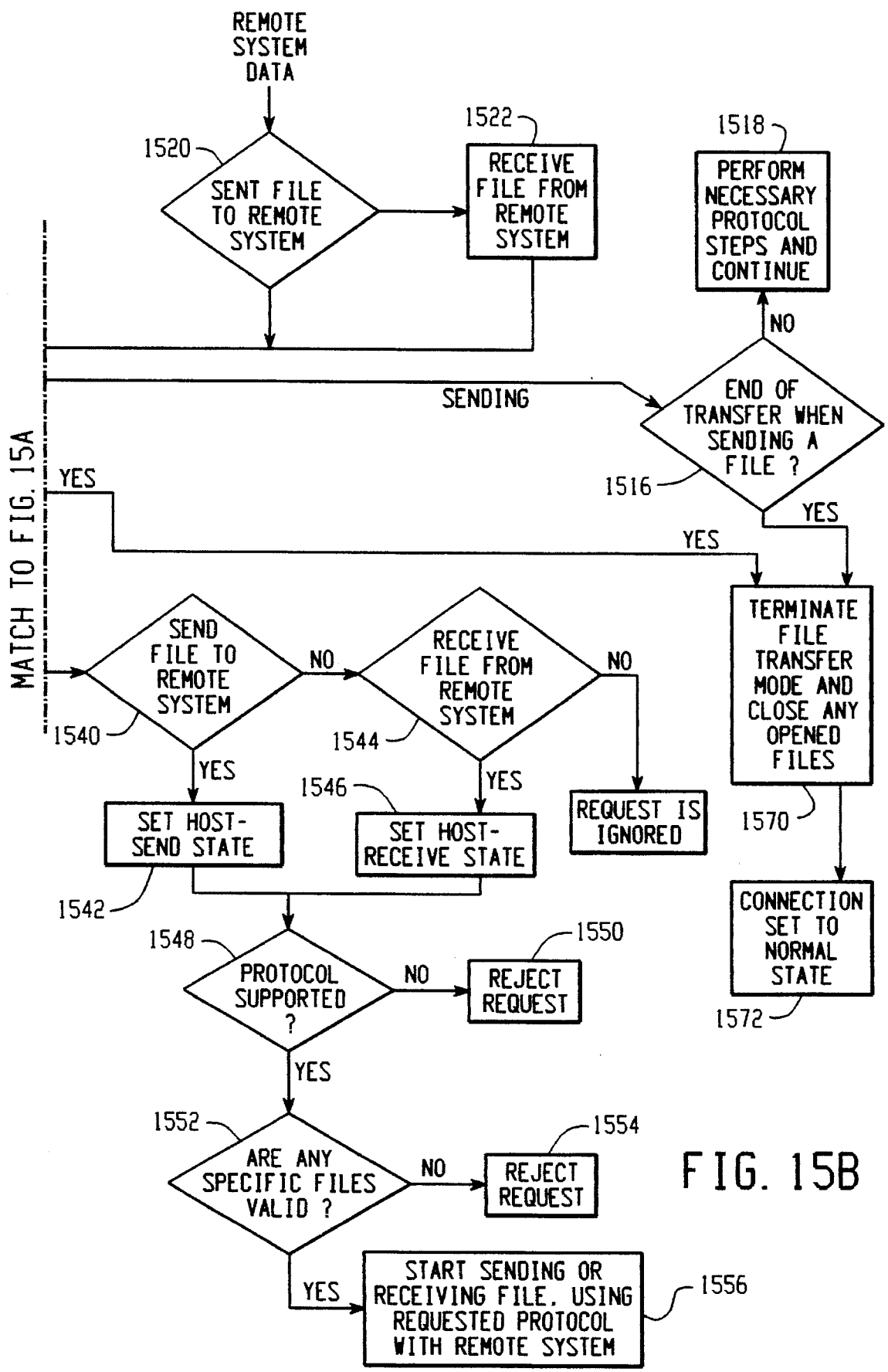

FIG. 15 is a state diagram showing the preferred method for performing a file transfer between the DTE 10 user and the gateway 13 or between the remote computer system 15 and the gateway 13. Inputs to this filter typically are the gateway control commands, normal data, or remote system data. Gateway control commands and normal data are entered at step 1500 where the gateway 13 program tests if the file transfer is already running. If yes then the gateway 13 program or filter assumes this data is from the DTE 10 user, is file content related, and writes the data to a file. The gateway 13 filter then determines, at step 1502, if this file transfer is to be sent to the DTE 10 user. If yes, the program proceeds to step 1504; otherwise the program proceeds to step 1506 and receives the file transfer from the DTE 10 user. Step 1506 is more frequently processed than step 1502 because in the send case of step 1502, the program is watching for the complete message only. On the other hand, if the gateway 13 program determines, at step 1504, that a file is being received then step 1508 looks for specific end of receive conditions associated with that particular file transfer method. If the end of receive conditions have been received step 1510 will terminate the file transfer mode, save the data, and step 1512 will set the connection to normal state. If the end of receive conditions have not been met then the program returns to the main loop of the program, as indicated at step 1514, and watches for further data to process.

Otherwise, if the step 1504 determines that gateway 13 is in sending file transfer mode step 1516 will check for a specific end of send condition associated with that particular file transfer method. If the file transfer is complete the file is closed at step 1510 and the connection returned to normal at step 1512. If the end of send condition has not been detected then, at step 1518, the necessary protocol steps are taken and the gateway 13 continues to receive data. If the gateway 13 gets input from the remote system 15 then the program in steps 1520 and 1522 must go through the same process as in steps 1502 and 1506 of determining if the input is a receive or send file. In the remote system 15 case, both types of filters are highly likely.

If step 1500 determine that a file transfer is not currently running when gateway control commands and normal data come in the gateway 13 program makes a check for what the DTE 10 user wants to do. The DTE 10 user's choice is one of four possibilities: to send the file to the user; to receive the file from the DTE user; to send the file to the remote system; or to receive the file from the remote system. If step 1524 detects that the DTE 10 user wants the gateway 13 to send a file then the gateway 13's internal state is set to a DIE-Send state at step 1526. If at step 1524 no file is to be sent step 1528 determines if the DTE 10 user wants the gateway 13 to receive a file, and then, at step 1530, the filter sets the gateway 13's internal state to a DTE-Receive state. After step 1526 or 1530 the gateway 13 program reads any header information in the file at step 1532, and then, at step 1534 verifies if the file size and name are correct and that the user has not requested a file that does not exist. If the file does not exist step 1536 rejects the request; but if the file does exist then step 1538 starts a continuous file sending or receiving with the DTE 10 user.

If step 1528 determines no file is to be received from the DTE 10 user step 1540 determines if the DTE 10 user wants to send a file to the remote system 15. If the answer to step 1540 is yes the gateway 13 program, at step 1542, sets its internal state to a Host-Send state. If the answer to step 1540 is no step 1544 determines if the DTE 10 user wishes to receive a file from the remote system 15 and if yes step 1546 sets the gateway 13's internal state to Host-Receive state. If the file is not to be received from remote system 15 the request is rejected. After step 1542 or 1546 step 1548 determines if the requested protocol is supported by gateway 13. XMODEM, ZMODEM, and SEALINK are just a few of the industry standard protocols that may be supported by gateway 13. If step 1548 determines the protocol is not supported, step 1550 rejects the request. If step 1548 determines the protocol is supported step 1552 verifies the specified file name and if the name is invalid then it rejects the request as indicated at step 1554. If the name is valid step 1556 starts sending or receiving the file with the requested protocol.

Figure 16A:
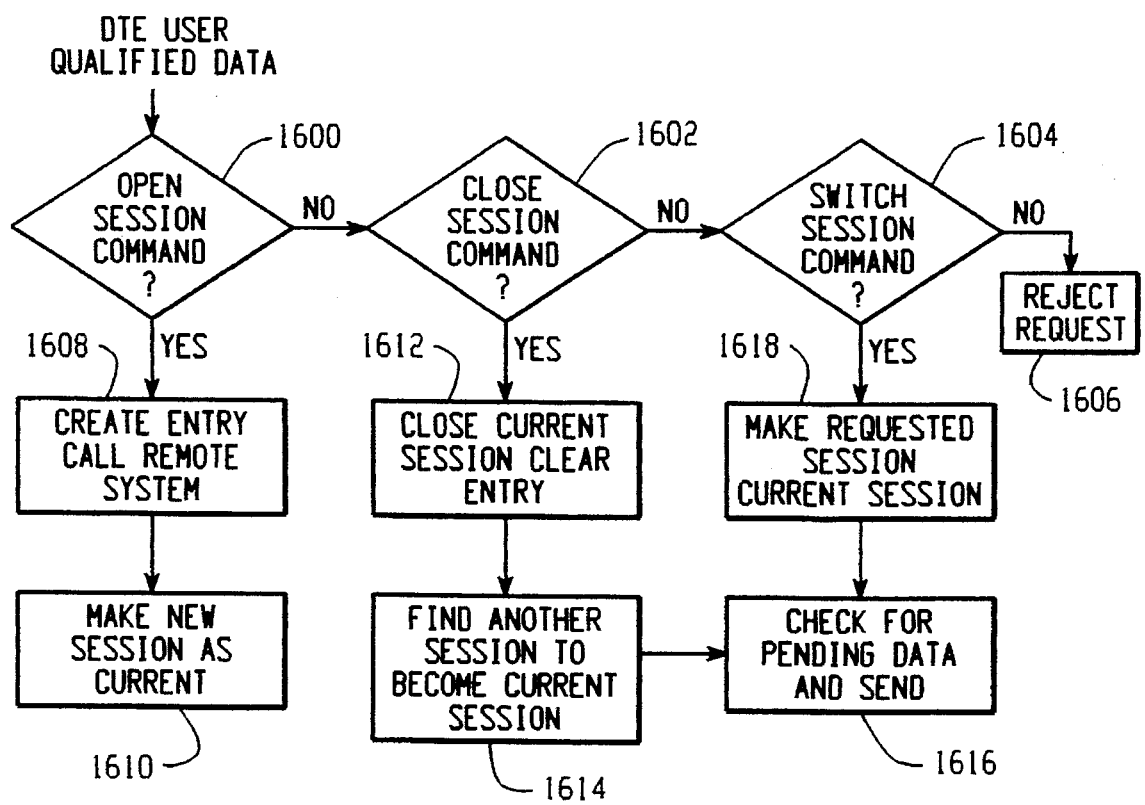
FIG. 16A is a state diagram illustrating the preferred method for processing inputs to the session switching module.
Figure 16B:
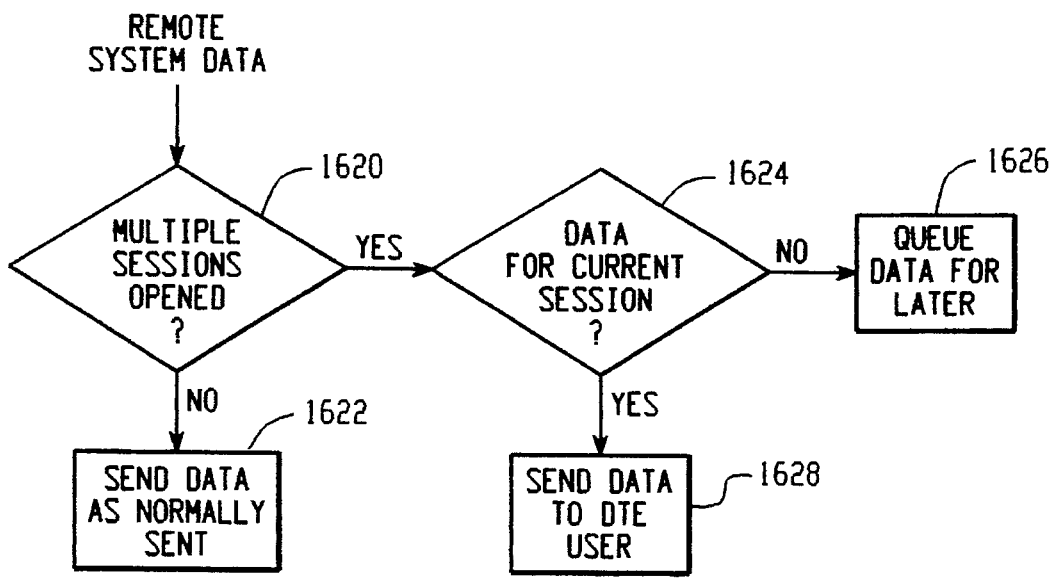
FIG. 16B is a state diagram illustrating the preferred method for processing data coming from the remote system in the session switching module.

FIGS. 16A and 16B are state diagrams showing the preferred method for performing session switching in a gateway 13. In order to enter a session switching module 33 the gateway 13 program is always looking for a DTE 10 user qualified data command. As shown in FIG. 16A the gateway 13 program checks, at step 1600, to see if the user wants to open a new session, or if the user wants to close an already opened session (step 1602), or if the user wants to switch to a different session (step 1604). If the gateway 13 program does not find a match in any of steps 1600–1604 then step 1606 rejects the request. If, at step 1600, the user requests an open session command step 1608 creates a connection entry with the necessary parameters and calls the remote system 15 using the inputs from the user (see overview diagram 8 for session switching). Step 1610 then makes the newly requested entry the current session and places the previous session in a background or paused state. If the DTE 10 user chooses to close a session at step 1602 then step 1612 closes the current session entry and frees up any data that may be pending. Step 1614 then finds another session to become the current session for the user. One of several ways to do this, requires the user to specify in the close command the session that she wants to make current otherwise, the gateway 13 just presents her with the next session in the link list of open sessions if there are more than two sessions active. Once step 1614 chooses a new session, step 1616 then checks if the new session has any pending data for the user because the user has the option of having data from a non-current session held until that session becomes the current one. In this way the user does not get data from multiple sessions overlapping on the DTE 10 screen. If at step 1604 the user requested switching sessions, then step 1618 makes the requested session current. The gateway 13 program puts the previous session back in the list where it is no longer the current session. The program then proceeds to step 1616 and checks the new session for any pending data to send to the DTE 10 user.

The FIG. 16B diagram shows data coming from the remote system 15. The gateway 13 program checks if the user has multiple sessions open at step 1620. If there are not multiple sessions open then the gateway 13 program at step 1622 sends the data as it is normally sent. Step 1620 to 1622 is, typically, the most common situation. If there are not multiple sessions open step 1624 checks whether the data received is for the current session. If no then step 1626 queues the data for later presentation. If the data is for the current session then step 1628 sends the data to the DTE 10 user as is normally done.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A method of remote control by a user of a gateway that forms a bridge between different data networks, said gateway converting received data from one data network protocol to another, the method comprising the steps of:

storing, within the gateway, one or more commands which may be invoked remotely by the user, said commands causing a data exchange between the gateway and a remote system connected to one of the data networks;

transmitting via one of the data networks at least one data packet from data terminal equipment operated by the user to the gateway, wherein at least one data packet includes control data containing information directing the gateway to execute one or more commands on behalf of the user;

validating that each of the one or more commands to be executed on behalf of the user is stored within the gateway; and executing each command that is validated in the validating step.

2. The method of claim 1, wherein the method further includes a step of transmitting to the user via the gateway a response to each command executed in the executing step, said response originating from either the gateway or the remote system connected to one of the data networks.

3. The method of claim 1, wherein such method further includes a step of treating data requesting a connection with the gateway as control data containing the information directing the gateway to execute one or more commands on behalf of the user, said commands establishing a connection via the gateway to the remote system.

4. The method of claim 1, wherein such method further includes a step of directing control data from the gateway to data communications equipment that is connected to the remote system, said control data altering the operational parameters of said data communications equipment.

5. The method of claim 1, wherein the step of executing each command that is validated in the validating step includes executing at least one command that creates a connection between the remote computer system and the gateway.

6. The method of claim 1, wherein the step of executing each command that is validated in the validating step includes a step of providing a communication script for filtering out unnecessary data received by the gateway from the remote system from being transmitted to the user.

7. The method of claim 1, wherein the step of executing each command that is validated in the validating step includes a step of establishing and implementing file transfer protocols between the gateway and the remote system connected to one of the data networks.

8. The method of claim 1, wherein the step of executing each command that is validated in the validating step includes a step of executing at least one command to enable the user to initiate at least one of opening, switching between and closing a plurality of connections with multiple remote systems and a step of enabling the user to manage the plurality of connections simultaneously.

9. The method of claim 1, wherein at least one of the communications networks is a wireless data communication network.

10. A method of remote control by a user of a gateway that forms a bridge between different data networks, said gateway converting received data from one data network protocol to another, the method comprising the steps of:

storing, within the gateway, one or more commands which the user may remotely direct be executed;

transmitting via one of the data networks to the gateway at least one data packet from data terminal equipment operated by the user to the gateway, wherein at least one data packet includes control data;

using the gateway to extract from the data packet the control data, said control data including information directing the gateway to execute one or more commands stored in the gateway; and executing at least one command extracted from the data packet transmitted by the user, thereby changing the operation of the gateway.

11. The method of claim 10, wherein the method further includes a step of transmitting to the user via the gateway a response to each command executed in the executing step, said response originating from either the gateway or a remote system connected to one of the data networks.

12. The method of claim 10, wherein such method further includes a step of treating data requesting a connection with the gateway as control data containing the information directing the gateway to execute one or more commands, said commands establishing a connection via the gateway to a remote system connected to one of the data networks.

13. The method of claim 10, wherein such method further includes a step of directing control data from the gateway to data communications equipment that is connected to one of the data networks and is located remotely from the data terminal equipment, said control data altering the operational parameters of said data communications equipment.

14. The method of claim 10, wherein the step of executing at least one command that is extracted from the data packet transmitted by the user includes executing at least one command that creates a connection between a remote computer system connected to one of said data networks and the gateway.

15. The method of claim 10, wherein the step of executing at least one command that is extracted from the data packet transmitted by the user includes a step of providing a communication script for filtering out unnecessary data received by the gateway from a remote system from being transmitted to the user.

16. The method of claim 10, wherein the step of executing at least one command that is extracted from the data packet transmitted by the user includes a step of establishing and implementing file transfer protocols between the gateway and a remote system connected to one of the data networks.

17. The method of claim 10, wherein the step of executing at least one command that is extracted from the data packet transmitted by the user includes a step of executing at least one command to enable the user to initiate at least one of opening, switching between and closing a plurality of connections with multiple remote systems and a step of enabling the user to manage the plurality of connections simultaneously.

18. The method of claim 10, wherein at least one of the communications networks is a wireless data communication network.

19. A gateway apparatus for transferring data between multiple communications networks wherein at least one of the networks is a wireless network, the gateway comprising:

an interface for receiving one or more data packets from a communication network;

a buffer operatively connected to the interface for storing each data packet;

a communication network decoder and a communication network encoder for each unique network protocol associated with each of the multiple communication networks that is connected to the gateway apparatus, wherein when activated, each decoder decodes based upon a first associated protocol and each encoder encodes based upon a second associated protocol, thereby enabling reading of data packets, with the decoder removing predetermined communication network protocol information from at least one data packet and the encoder adding predetermined communication network protocol information to at least one data packet;

memory for storing in the gateway, configuration parameters, scripting information, and one or more commands which may be remotely selected for execution by a user connected to one of the networks; and processing means for executing said one or more stored commands selected by the remote user.

20. The apparatus of claim 19, wherein each decoder and each encoder comprises a separate microprocessor.

21. The gateway apparatus according to claim 19, wherein one of the one or more commands creates a connection between a remote computer system connected to one of the networks and the gateway.

22. The gateway apparatus according to claim 19, wherein one of the one or more commands causes a series of data exchanges to take place between the gateway and a remote computer system connected to one of the networks based upon the scripting information stored within the memory of the gateway.

23. The gateway apparatus according to claim 19, wherein one of the one or more commands establishes and implements a file transfer protocol between the gateway and a remote computer system connected to one of the networks.

24. The gateway apparatus according to claim 19, wherein one of the one or more commands enables the user to initiate at least one of opening, switching between and closing a plurality of connections with multiple remote computer systems.

25. The gateway apparatus according to claim 24, wherein one of the one or more commands enables the user to manage the plurality of connections simultaneously.

26. The gateway apparatus according to claim 19, wherein one of the one or more commands causes a data exchange between the gateway and a remote computer system connected to one the networks.

27. The gateway apparatus according to claim 19, wherein the interface is a serial interface.

28. The gateway apparatus according to claim 19, wherein one of the data networks is a synchronous digital network.

* * * * *